(12) United States Patent
Osawa

(10) Patent No.: US 10,999,523 B2
(45) Date of Patent: May 4, 2021

(54) IMAGE PICKUP APPARATUS, METHOD FOR CONTROLLING IMAGE PICKUP APPARATUS, AND STORAGE MEDIUM FOR CONTROLLING FLASH PHOTOGRAPHY WHEN A STILL IMAGE IS IMAGED

(71) Applicant: CANON KABUSHIKI KAISHA, Tokyo (JP)

(72) Inventor: Toshifumi Osawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 74 days.

(21) Appl. No.: 16/259,813

(22) Filed: Jan. 28, 2019

(65) Prior Publication Data
US 2019/0246028 A1   Aug. 8, 2019

(30) Foreign Application Priority Data
Feb. 2, 2018   (JP) .............................. JP2018-017494

(51) Int. Cl.
| | | |
|---|---|---|
| *H04N 5/235* | (2006.01) | |
| *G03B 15/05* | (2021.01) | |
| *H04N 5/225* | (2006.01) | |
| *H04N 5/374* | (2011.01) | |
| *H04N 5/355* | (2011.01) | |
| *H04N 5/341* | (2011.01) | |

(52) U.S. Cl.
CPC ........... *H04N 5/2354* (2013.01); *G03B 15/05* (2013.01); *H04N 5/2256* (2013.01); *H04N 5/3415* (2013.01); *H04N 5/35563* (2013.01); *H04N 5/374* (2013.01)

(58) Field of Classification Search
CPC ............... H04N 5/2354; H04N 5/3415; H04N 5/35563; H04N 5/374; H04N 5/2256; G03B 15/05; G03B 7/09979; G03B 7/09972; G03B 19/20; G03B 19/12; G03B 7/16
See application file for complete search history.

(56) References Cited

U.S. PATENT DOCUMENTS

2013/0201369 A1* 8/2013 Hirose ................ H04N 5/3532
                                                      348/272

FOREIGN PATENT DOCUMENTS

| JP | 9-184965 A | 7/1997 |
|---|---|---|
| JP | 2005-117192 A | 4/2005 |
| JP | 2005-184508 A | 7/2005 |
| JP | 2005-275265 A | 10/2005 |
| JP | 5610961 B2 | 10/2014 |
| JP | 5893550 B2 | 3/2016 |

* cited by examiner

*Primary Examiner* — Twyler L Haskins
*Assistant Examiner* — Angel L Garces-Rivera
(74) *Attorney, Agent, or Firm* — Canon U.S.A., Inc. IP Division

(57) ABSTRACT

An apparatus includes a sensor including a plurality of arranged pixels, having a first sensitivity for a first area of the plurality of arranged pixels and a second sensitivity lower than the first sensitivity for a second area of the plurality of arranged pixels during preliminary light emission of a flash, and a processing circuit configured to generate an image of a subject area to be imaged based on a signal obtained by performing correction corresponding to a difference between the first sensitivity and the second sensitivity on a signal acquired from the sensor.

16 Claims, 19 Drawing Sheets

FIG.14

|  | SECOND GAIN | FIRST GAIN |
|---|---|---|
| GAIN SETTING 1 | × 4 | × 1 |
| GAIN SETTING 2 | × 8 | × 2 |
| GAIN SETTING 3 | × 8 | × 1 |

FIG.15A

DUMMY DATA | 10-BIT AD CONVERSION DATA

| D12 | D11 | D10 | D9 | D8 | D7 | D6 | D5 | D4 | D3 | D2 | D1 | D0 |

FIG.15B

10-BIT AD CONVERSION DATA

| D9 | D8 | D7 | D6 | D5 | D4 | D3 | D2 | D1 | D0 |

DUMMY DATA — 1-BIT SHIFT — DUMMY DATA

| D12 | D11 | D10 | D9 | D8 | D7 | D6 | D5 | D4 | D3 | D2 | D1 | D0 |

FIG.15C

10-BIT AD CONVERSION DATA

| D9 | D8 | D7 | D6 | D5 | D4 | D3 | D2 | D1 | D0 |

DUMMY DATA — 2-BIT SHIFT — DUMMY DATA

| D12 | D11 | D10 | D9 | D8 | D7 | D6 | D5 | D4 | D3 | D2 | D1 | D0 |

FIG.15D

10-BIT AD CONVERSION DATA

| D9 | D8 | D7 | D6 | D5 | D4 | D3 | D2 | D1 | D0 |

3-BIT SHIFT — DUMMY DATA

| D12 | D11 | D10 | D9 | D8 | D7 | D6 | D5 | D4 | D3 | D2 | D1 | D0 |

FIG.19A

| CONDITION | BIT SHIFT AMOUNT |
|---|---|
| FREQUENCY OF DATA HAVING PIXEL VALUE OF 255 OR LESS IS PREDETERMINED VALUE OR MORE | 5 |
| FREQUENCY OF DATA HAVING PIXEL VALUE OF 255 OR LESS IS LESS THAN PREDETERMINED VALUE AND FREQUENCY OF DATA HAVING PIXEL VALUE OF 511 OR LESS IS PREDETERMINED VALUE OR MORE | 4 |
| FREQUENCY OF DATA HAVING PIXEL VALUE OF 511 OR LESS IS LESS THAN PREDETERMINED VALUE AND FREQUENCY OF DATA HAVING PIXEL VALUE OF 1023 OR LESS IS PREDETERMINED VALUE OR MORE | 3 |
| FREQUENCY OF DATA HAVING PIXEL VALUE OF 1023 OR LESS IS LESS THAN PREDETERMINED VALUE AND FREQUENCY OF DATA HAVING PIXEL VALUE OF 2047 OR LESS IS PREDETERMINED VALUE OR MORE | 2 |
| FREQUENCY OF DATA HAVING PIXEL VALUE OF 2047 OR LESS IS LESS THAN PREDETERMINED VALUE AND FREQUENCY OF DATA HAVING PIXEL VALUE OF 4095 OR LESS IS PREDETERMINED VALUE OR MORE | 1 |
| FREQUENCY OF DATA HAVING PIXEL VALUE OF 4095 OR LESS IS LESS THAN PREDETERMINED VALUE | 0 |

FIG.19B

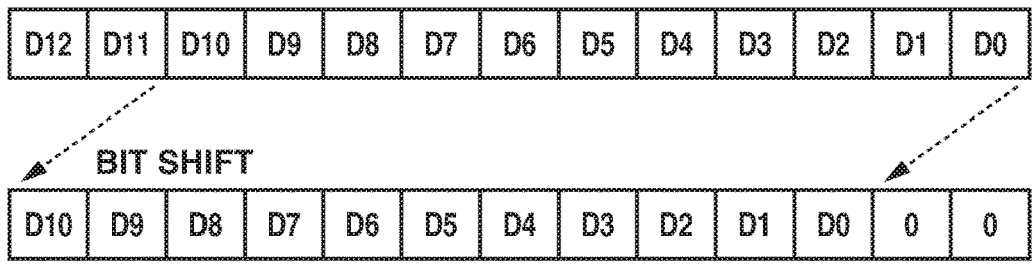

FIG.19C

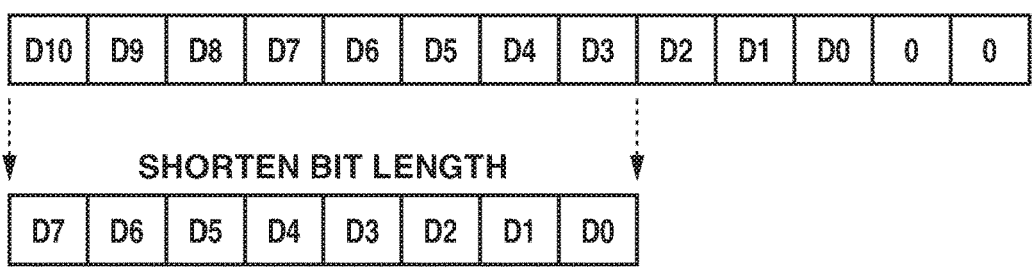

IMAGE PICKUP APPARATUS, METHOD FOR CONTROLLING IMAGE PICKUP APPARATUS, AND STORAGE MEDIUM FOR CONTROLLING FLASH PHOTOGRAPHY WHEN A STILL IMAGE IS IMAGED

BACKGROUND OF THE INVENTION

Field of the Invention

The aspect of the embodiments relates to a technique for controlling flash photography when a still image or the like is imaged.

Description of the Related Art

Conventionally, in a case where flash photography is performed, a control method is known in which preliminary light emission (pre-emission) of a flash is performed prior to main imaging to determine a flash light emission amount during the main imaging based on a photometric value of light reflected from a subject during the preliminary light emission.

Japanese Patent Application Laid-Open No. 2005-117192 discloses a technique in which a photometry luminance range is enlarged by setting a plurality of types of the numbers of charges to be added in a vertical direction of a photometric sensor when photometry of reflected light from a subject during preliminary light emission of a flash is performed.

Japanese Patent Application Laid-Open No. 2005-184508 discloses a technique in which imaging exposure accuracy during portrait imaging is improved by performing face detection of the person from image information obtained by performing photometry on reflected light from a subject during preliminary light emission of a flash to determine a flash light emission amount during main imaging by using a result of the face detection.

Since the preliminary light emission of a flash is normally performed with a predetermined amount of light emission, a large photometric value can be obtained from a subject portion existing at a short distance, and a small photometric value can be obtained from a subject portion existing at a long distance. On the other hand, although the photometry luminance range of the photometric sensor is limited, according to the technique disclosed in Japanese Patent Application Laid-Open No. 2005-117192, the photometry luminance range can be enlarged so that the amount of reflected light from the subject in a wide distance range from a short distance to a long distance can be measured. However, in a case where the photometry luminance range is enlarged by the technique disclosed in Japanese Patent Application Laid-Open No. 2005-117192, non-uniformity of a vertical resolution and a light reception sensitivity may occur in the photometric sensor, and image quality may be deteriorated. Therefore, for example, it may be difficult to detect a subject area to be imaged such as a face image of a person from the image information obtained by performing photometry of the reflected light from the subject during the preliminary light emission of a flash as disclosed in Japanese Patent Application Laid-Open No. 2005-184508.

Therefore, a technique that enables enlargement of a photometry luminance range of reflected light from a subject or the like during preliminary light emission of a flash, and detection of a subject area from image information based on the reflected light is sought.

SUMMARY OF THE INVENTION

According to an aspect of the embodiments, an apparatus includes a sensor including a plurality of arranged pixels, having a first sensitivity for a first area of the plurality of arranged pixels and a second sensitivity lower than the first sensitivity for a second area of the plurality of arranged pixels during preliminary light emission of a flash, and a processing circuit configured to perform correction corresponding to a difference between the first sensitivity and the second sensitivity on a signal acquired from the sensor, and generate an image of a subject area to be imaged based on the corrected signal.

Further features of the disclosure will become apparent from the following description of exemplary embodiments with reference to the attached drawings.

BRIEF DESCRIPTION OF THE DRAWINGS

FIG. 14 is a diagram illustrating an example of a gain setting in a photometric sensor according to a third exemplary embodiment.

FIG. 15A is a diagram used for description of addition of 3-bit dummy data to data subjected to analog-to-digital (AD) conversion according to the third exemplary embodiment.

FIG. 15B is a diagram used for description of 1-bit shift of the data subjected to AD conversion to which the 3-bit dummy data is added.

FIG. 15C is a diagram used for description of 2-bit shift of the data subjected to AD conversion to which the 3-bit dummy data is added.

FIG. 15D is a diagram used for description of 3-bit shift of the data subjected to AD conversion to which the 3-bit dummy data is added.

FIG. 19A is a diagram used for description of a bit shift amount according to the third exemplary embodiment.

FIG. 19B is a diagram used for description of bit shift.

FIG. 19C is a diagram used for description of data truncation after the bit shift.

DESCRIPTION OF THE EMBODIMENTS

Hereinbelow, exemplary embodiments of the disclosure will be described in detail with reference to the accompanying drawings.

Figure 1:
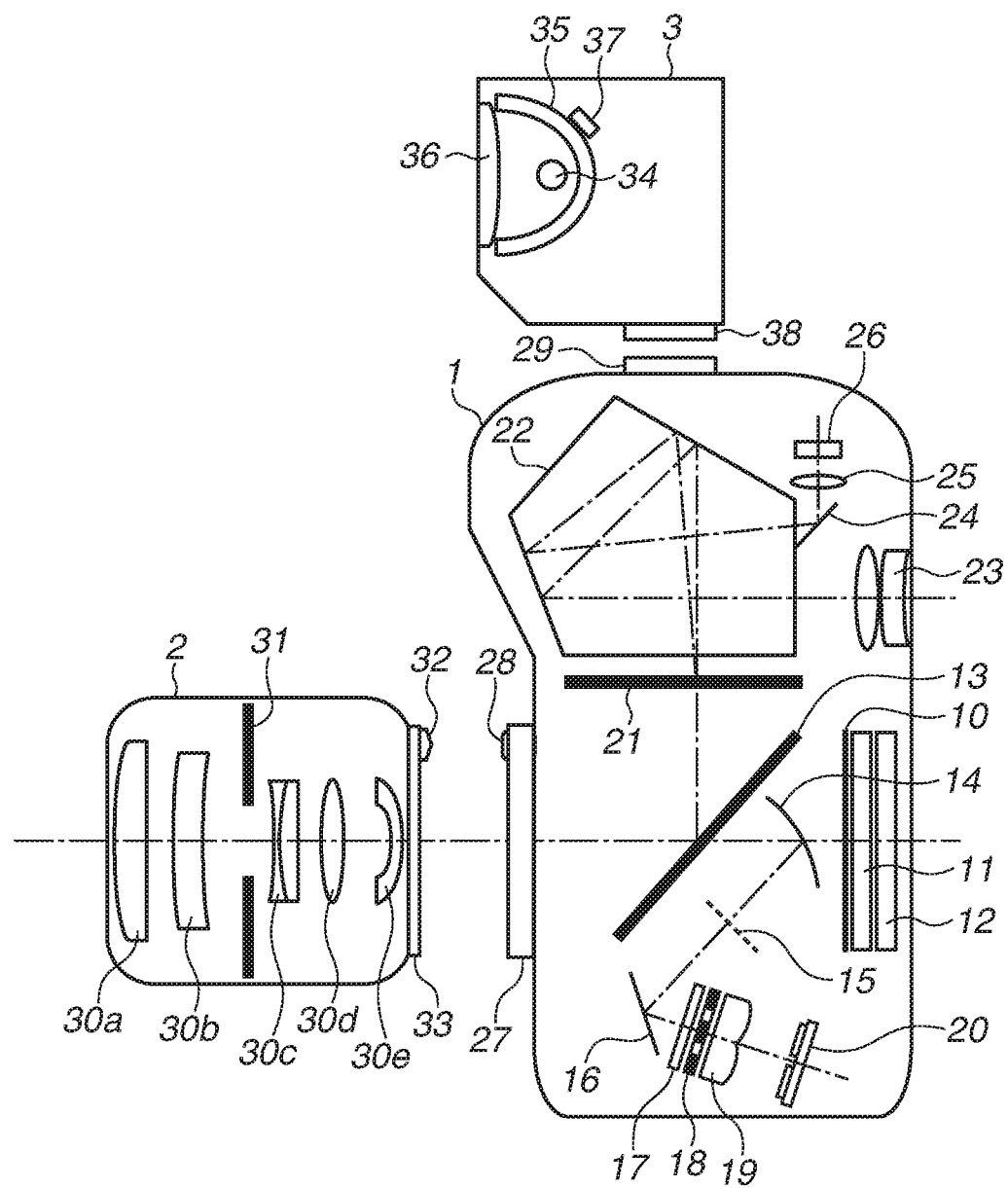
FIG. 1 is a schematic cross-sectional view of a camera, an interchangeable lens, and a flash device.

FIG. 1 is a schematic cross-sectional view mainly representing arrangement of an optical member, a sensor, and the like in a camera, an interchangeable lens, and a flash device according to a first exemplary embodiment of the disclosure. FIG. 1 illustrates a schematic configuration of a so-called single-lens reflex camera with an interchangeable lens, including a camera body (hereinbelow referred to as a camera 1), an interchangeable lens 2 detachable from the camera 1, and a flash device 3 detachable from the camera 1.

The camera 1 includes a mechanical shutter 10, an optical low pass filter 11, an image pickup element 12 in which a plurality of storage-type photoelectric conversion elements such as complementary metal oxide semiconductor (CMOSs) or charge coupled devices (CCDs) is arranged, a semi-transparent main mirror 13, and a first reflection mirror 14. Both of the main mirror 13 and the first reflection mirror 14 jump upward during imaging. The camera 1 also includes a second reflection mirror 16, an infrared cut filter 17, a diaphragm 18, a secondary image-forming lens 19, and a focus detection sensor 20. The diaphragm 18 has two openings. The camera 1 further includes a focusing plate 21 having light diffusibility, a pentaprism 22, an eyepiece lens 23, a third reflection mirror 24, a condenser lens 25, and a photometric sensor 26 that acquires information regarding luminance of a subject or the like. The focusing plate 21, the pentaprism 22, and the eyepiece lens 23 constitute a viewfinder optical system. Among light beams reflected by the main mirror 13 and diffused by the focusing plate 21, a light beam outside an optical axis enters the photometric sensor 26.

Figure 2:
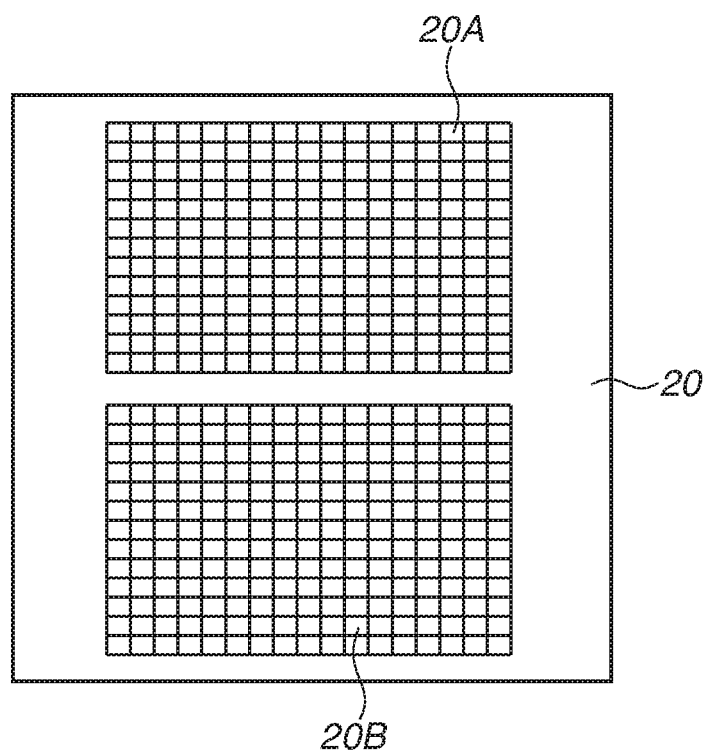
FIG. 2 is a diagram illustrating a configuration example of a focus detection sensor.

The focus detection sensor 20 is an autofocus (AF) sensor. In the focus detection sensor 20, a plurality of storage-type photoelectric conversion elements such as CMOSs or CCDs is arranged. Further, as illustrated in FIG. 2, the focus detection sensor 20 has a configuration divided into two areas, i.e., a light reception sensor parts 20A and 20B corresponding to the two openings of the diaphragm 18. Furthermore, the focus detection sensor 20 includes a signal accumulation unit, a peripheral circuit for signal processing, and the like (not illustrated) formed on a same chip as an integrated circuit, in addition to the light reception sensor parts 20A and 20B. FIG. 1 also illustrates a paraxial image plane 15 conjugate with an image pickup plane of the image pickup element 12 by the first reflection mirror 14. The configuration from the first reflection mirror 14 to the focus detection sensor 20 enables focus detection using a phase detection method at an arbitrary position in an imaging screen, as discussed in detail in Japanese Patent Application Laid-Open No. H09-184965, for example.

Figure 3A:
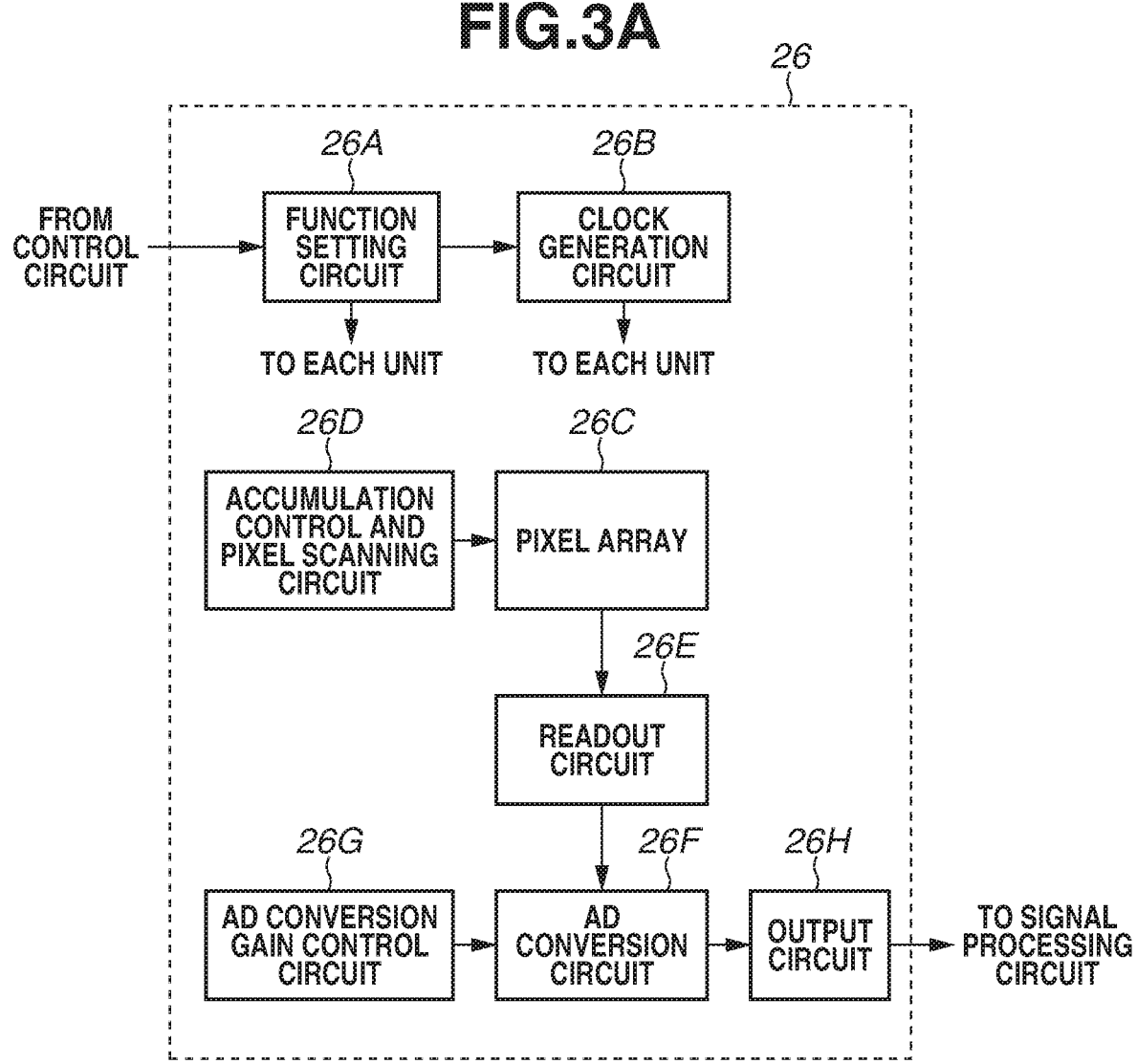
FIG. 3A is a diagram illustrating a configuration example of a photometric sensor.

The photometric sensor 26 is an automatic exposure (AE) sensor. The photometric sensor 26 receives light from the subject or the like during preliminary light emission (pre-emission) of a flash or under steady light without flash light emission, and acquires a photometric signal of the subject or the like described below from light reception signals. FIG. 3A is a block diagram illustrating a schematic internal configuration example of the photometric sensor 26. The photometric sensor 26 includes a function setting circuit 26A, a clock generation circuit 26B, a pixel array 26C, an accumulation control and pixel scanning circuit 26D, a readout circuit 26E, an analog-to-digital (AD) conversion circuit 26F, an AD conversion gain control circuit 26G, and an output circuit 26H.

The function setting circuit 26A sets functions of operation clock control, accumulation control, AD conversion control, and the like in the sensor, based on data transmitted from a control circuit 41 described below. The clock generation circuit 26B generates the operation clock inside the sensor.

Figure 3B:
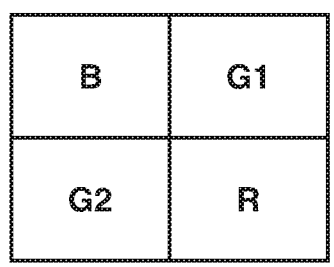
FIG. 3B is a diagram illustrating an arrangement of color filters of a pixel array of the photometric sensor.

In the pixel array 26C, storage-type photoelectric conversion elements such as a light reception element for photoelectric conversion (hereinbelow referred to as a pixel), e.g., CMOSs or CCDs are arranged in a large number, e.g., several tens of thousands to several hundreds of thousands of pixels. Further, the pixel array 26C includes a so-called Bayer array color filter including, as one Bayer, a blue transmission filter (B), green transmission filters (G1 and G2), and a red transmission filter (R), as illustrated in FIG. 3B. Therefore, in the pixel array 26C, color information can be acquired in addition to luminance of an incident image.

The accumulation control and pixel scanning circuit 26D performs charge accumulation control in each pixel (light reception element) of the pixel array 26C and scanning control during read-out of the light reception signal from each pixel (hereinbelow referred to as a pixel signal).

The readout circuit 26E is a readout control circuit that sequentially reads out charges accumulated in each pixel of the pixel array 26C as an analog pixel signal (light reception signal). The analog pixel signal read out from the pixel array 26C by the readout circuit 26E is sent to the AD conversion circuit 26F.

The AD conversion circuit 26F digitally converts the input analog pixel signal.

The AD conversion gain control circuit 26G adjusts a conversion gain of the AD conversion circuit 26F.

Although details will be described below, the AD conversion gain control circuit 26G can set an analog gain when the pixel signal read out from the pixel array 26C is subjected to AD conversion by the AD conversion circuit 26F to one of at least two different gains for each row or pixel of a plurality of pixels. Therefore, the AD conversion circuit 26F performs AD conversion on the pixel signal based on the gain set for each row or pixel of the plurality of pixels by the AD conversion gain control circuit 26G. That is, in the photometric sensor 26 according to the present exemplary embodiment, different sensitivities are set for each row or pixel of the plurality of pixels of the pixel array 26C, and the AD conversion of the pixel signal based on the set sensitivities is performed. The pixel signal digitally converted by the AD conversion circuit 26F is then sent to the output circuit 26H.

The output circuit 26H performs parallel-serial conversion, conversion into a differential signal, or the like as necessary on the pixel signal supplied from the AD conversion circuit 26F. The signal converted by the output circuit 26H is then output as a photometric signal in the photometric sensor 26 according to the present exemplary embodiment to a signal processing circuit 42 described below.

Returning to the description of FIG. 1, a mount 27 is a configuration to detachably attach the interchangeable lens 2 to the camera 1. A contact terminal 28 communicates information with the interchangeable lens 2. A connection mechanism 29 is a configuration to detachably attach the flash device 3 to the camera 1, and has a contact terminal that is not illustrated.

The interchangeable lens 2 includes optical lenses 30a to 30e constituting an imaging lens, a diaphragm 31, a contact terminal 32, and a mount 33. The mount 33 is a configuration to attach the interchangeable lens 2 to the camera 1. The contact terminal 32 communicates information with the camera 1.

The flash device 3 includes a light emission member 34 such as a xenon tube, a reflector 35, a Fresnel lens 36 for condensing light, a light emission monitor sensor 37, and an attachment mechanism 38. The light emission monitor sensor 37 monitors an amount of light emission by the xenon tube or the like serving as the light emission member 34. The attachment mechanism 38 is a configuration to attach the flash device 3 to the camera 1. The attachment mechanism 38 is provided with a contact terminal that is not illustrated, and the contact terminal can be electrically connected with the contact terminal provided in the connection mechanism 29 of the camera 1.

Figure 4:
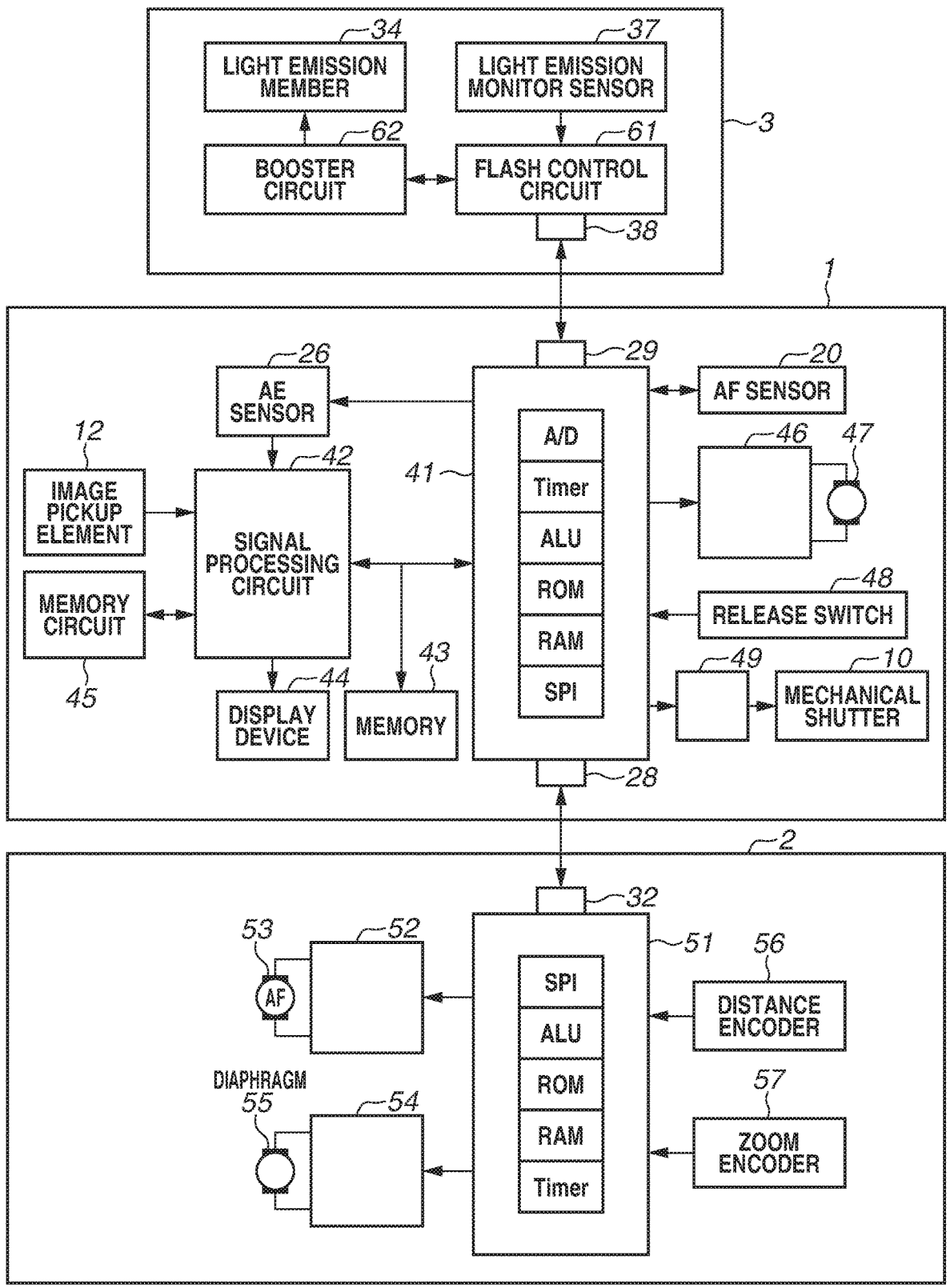
FIG. 4 is a view illustrating a configuration example of electric circuits of the camera, the interchangeable lens, and the flash device.

FIG. 4 is a block diagram illustrating electric circuit structures of the camera 1, the interchangeable lens 2, and the flash device 3 according to the present exemplary embodiment.

The camera 1 includes, as the electric circuit structure, the control circuit 41, a signal processing circuit 42, a memory 43, a display device 44, a memory circuit 45, a first motor driver 46, a first motor 47, a release switch 48, and a shutter drive mechanism 49. The image pickup element 12, the focus detection sensor 20 (AF sensor), the photometric sensor 26 (AE sensor), the contact terminal 28, and the connection mechanism 29 are the same as those described with reference to FIG. 1.

The control circuit 41 performs overall control of a camera mechanism and the like. The control circuit 41 includes, for example, a one-chip microcomputer incorporating an arithmetic and logic operation circuit (arithmetic and logic unit (ALU)), a read-only memory (ROM), a random-access memory (RAM), an AD converter, a timer, and a serial peripheral interface (SPI). A specific control flow in the control circuit 41 will be described below. An output signal of the focus detection sensor 20 is input to the control circuit 41 via an AD converter input terminal.

The signal processing circuit 42 controls the image pickup element 12 based on an instruction from the control circuit 41, performs AD conversion on an image pickup signal output from the image pickup element 12, and then performs signal processing on the signal to generate image data. The signal processing circuit 42 also performs image processing such as compression when storing the generated image data in the memory circuit 45 described below. Further, the signal processing circuit 42 has a function of detecting a face area of a person from an input image.

The signal processing circuit 42 also receives a signal from the photometric sensor 26, and performs signal processing on the signal. Although details will be described below, the signal processing circuit 42 performs, on the photometric signal obtained by AD-conversion of the pixel signal based on the sensitivities set for each row or pixel of the plurality of pixels of the pixel array 26C of the photometric sensor 26 as described above, sensitivity difference correction corresponding to a difference in the set sensitivities. Although details will be described below, the signal processing circuit 42 uses the signal corrected based on the difference in the sensitivities, as luminance information during preliminary light emission of a flash, and generates an image of a subject area to be imaged such as a face of a person from the luminance information during the preliminary light emission of a flash. The signal processing circuit 42 then sends image information generated from the luminance information of the subject area such as the face to the control circuit 41. The control circuit 41 determines an amount of light emission during main light emission in the flash device 3 based on the image information generated from the luminance information of the subject area. As a result, the control circuit 41 controls light emission of the flash device 3 based on the amount of light emission. The main light emission of the flash device 3 means flash light emission when main imaging is performed in the camera 1.

The memory 43 includes a dynamic random access memory (DRAM), and is used as a work memory when the signal processing circuit 42 performs various types of signal processing, or a video random access memory (VRAM) when an image is displayed on the display device 44 described below.

The display device 44 includes a liquid crystal panel or an organic electroluminescence (EL) panel, is subjected to lighting control in response to an instruction from the control circuit 41, and displays various pieces of imaging information, picked-up images, and the like.

The memory circuit 45 includes a storage medium such as a flash memory or an optical disc, and stores the image data imaged and processed by the signal processing circuit 42.

Under control of the control circuit 41, the first motor driver 46 drives the first motor 47 for performing up/down operations of the main mirror 13 and the first reflection mirror 14 and charging the mechanical shutter 10.

The release switch 48 is operated when a user gives an instruction to start imaging.

As also illustrated in FIG. 1, the contact terminal 28 is a contact with the interchangeable lens 2 and is connected to the serial communication port of the control circuit 41, so that a signal is input/output to/from the interchangeable lens 2.

The connection mechanism 29 is a contact with the flash device 3 in FIG. 1, and is connected to the serial communication port of the control circuit 41, so that a signal is input/output to/from the flash device 3.

Under control of the control circuit 41, the shutter drive mechanism 49 drives the mechanical shutter 10 in FIG. 1.

The interchangeable lens 2 includes, as the electric circuit structure, a lens control circuit 51, a second motor driver 52, a second motor 53, a third motor driver 54, a third motor 55, a distance encoder 56, and a zoom encoder 57. The contact terminal 32 is the same as that described with reference to FIG. 1.

The lens control circuit 51 includes, for example, a one-chip microcomputer incorporating an ALU, a ROM, a RAM, a timer, and an SPI to perform overall control of a mechanism and the like in the interchangeable lens 2.

Under control of the lens control circuit 51, the second motor driver 52 drives the second motor 53 that moves a focus lens for adjusting focus.

Under control of the lens control circuit 51, the third motor driver 54 drives the third motor 55 for moving the diaphragm 31 in FIG. 1.

The distance encoder 56 acquires information regarding a distance to the subject (hereinbelow referred to as subject distance information DT) from a movement amount (moving distance) of the focus lens, and sends the acquired subject distance information DT to the lens control circuit 51.

In a case where the interchangeable lens 2 includes a zoom lens, the zoom encoder 57 acquires focal length information during imaging from a zoom position of the zoom lens, and sends the acquired information to the lens control circuit 51.

As also illustrated in FIG. 1, the contact terminal 32 is a contact that sends/receives a signal to/from the camera 1, and is connected to the serial communication port of the lens control circuit 51.

When the interchangeable lens 2 is attached to the camera 1, the contact terminal 28 of the camera 1 and the contact terminal 32 of the interchangeable lens 2 are electrically connected, so that the lens control circuit 51 can perform data communication with the control circuit 41 of the camera 1. The lens control circuit 51 sends information for the control circuit 41 of the camera 1 to perform focus detection and exposure calculation, to the control circuit 41 by the data communication. Examples of the information for the control circuit 41 of the camera 1 to perform focus detection and exposure calculation include information indicating optical characteristics unique to the lens, the subject distance information DT acquired by the distance encoder 56, and the focal length information acquired by the zoom encoder 57. Furthermore, the control circuit 41 of the camera 1 sends focus adjustment information and diaphragm information generated based on results of performing the focus detection and the exposure calculation, to the lens control circuit 51 by the data communication. The lens control circuit 51 then controls the second motor driver 52 based on the focus adjustment information, and controls the third motor driver 54 based on the diaphragm information.

The flash device 3 includes, as the electric circuit structure, a flash control circuit 61, a booster circuit 62, the light emission member 34, the light emission monitor sensor 37, and the attachment mechanism 38. The light emission member 34, the light emission monitor sensor 37, and the attachment mechanism 38 are the same as those described with reference to FIG. 1.

The flash control circuit 61 includes, for example, a one-chip microcomputer incorporating an ALU, a ROM, a RAM, an AD converter, a timer, and an SPI.

The booster circuit 62 has a function of generating a high voltage of about 300 volts (V), for example, for the light emission of the xenon tube serving as the light emission member 34, and charging the high voltage.

When the flash device 3 is attached to the camera 1, the contact terminal of the connection mechanism 29 of the camera 1 and the contact terminal of the attachment mechanism 38 of flash device 3 are electrically connected, so that the flash control circuit 61 can perform the data communication with the control circuit 41 of the camera 1. The flash control circuit 61 controls the booster circuit 62 based on communication contents sent from the control circuit 41 of the camera 1 to start or stop the light emission of the xenon tube serving as the light emission member 34. The flash control circuit 61 also sends information indicating the amount of light emission monitored and detected by the light emission monitor sensor 37 to the control circuit 41 of the camera 1. Further, at the time of the light emission of the light emission member 34, the flash control circuit 61 can send, to the control circuit 41 of the camera 1, information about light emission color that changes depending on light emission conditions such as the amount of light emission or a charging voltage during light emission.

Next, a specific control sequence in the control circuit 41 of the camera 1 according to the present exemplary embodiment will be described with reference to a flowchart of FIG. 5. Further, the processing in the flowchart in FIG. 5 may be executed by a hardware configuration, or may be implemented by execution of a program by a central processing unit (CPU) or the like. The above-described matters also apply to other flowcharts described below. The processing in the flowchart of FIG. 5 starts when a power switch (not illustrated) is turned on to make the control circuit 41 operable, and the camera 1 goes into a still image imaging mode, for example.

Figure 5:
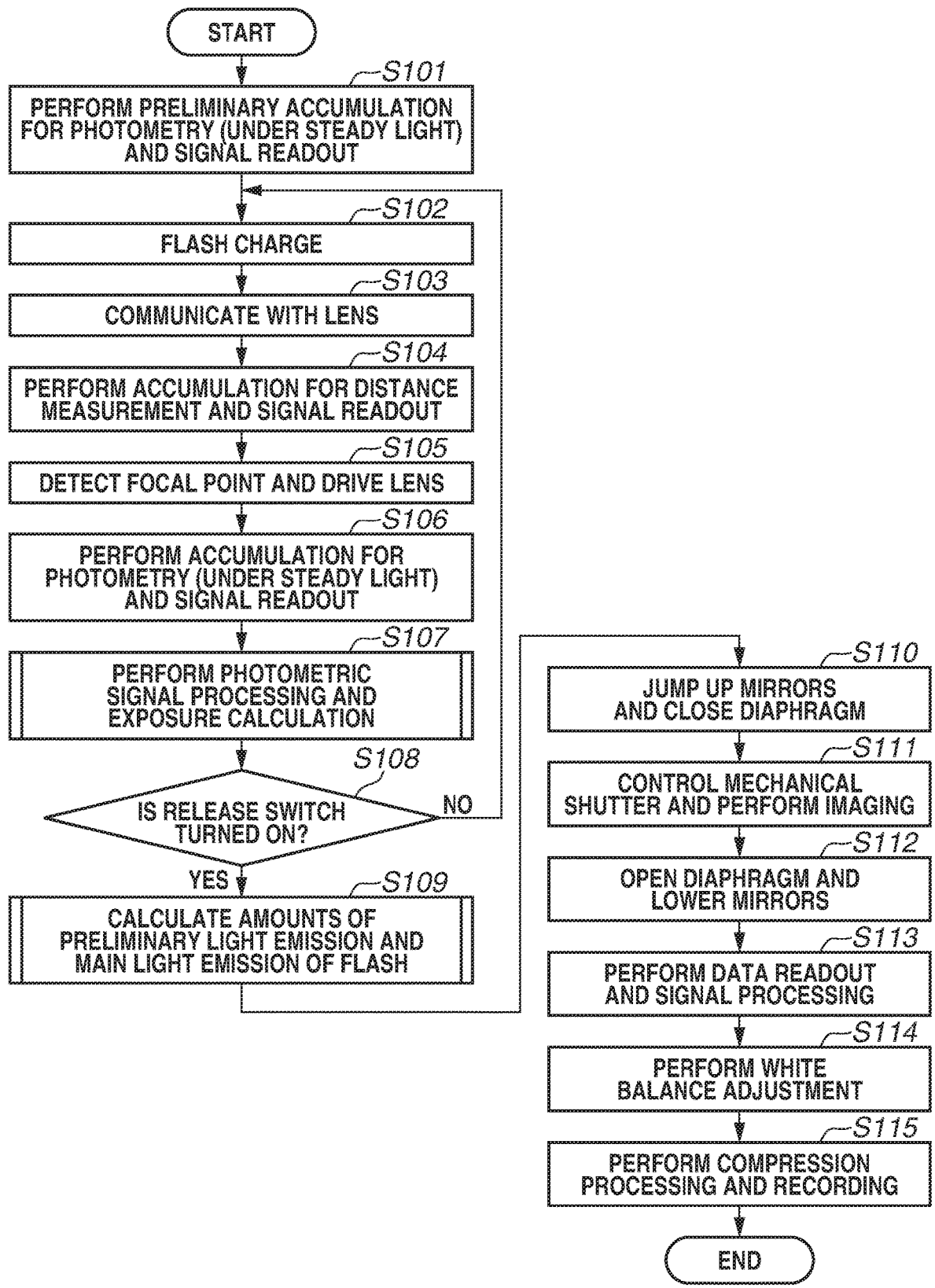
FIG. 5 is an operation flowchart of a control circuit of the camera.

When the processing in the flowchart of FIG. 5 starts, first in step S101, the control circuit 41 instructs the photometric sensor 26 to perform predetermined accumulation control and signal readout control. As a result, in the photometric sensor 26, charge accumulation is performed for a predetermined time based on the predetermined accumulation control, and pixel signals of a plurality of pixels are read out based on the signal readout control. The photometric sensor 26 then performs AD conversion on the pixel signals of the plurality of pixels read out based on the signal readout control, and sequentially sends the pixel signals to the signal processing circuit 42. The signal processing circuit 42 acquires a preliminary photometric value in the subject by performing block integration or the like on the signal received from the photometric sensor 26. The preliminary photometric value is used for the setting of an accumulation time or the like in the next accumulation control, as rough information about brightness of the current subject under the steady light without flash light emission.

Next, in step S102, the control circuit 41 instructs the flash control circuit 61 to operate the booster circuit 62 to charge the high voltage so as to be sufficient for flash light emission.

Further, in step S103, the control circuit 41 communicates with the lens control circuit 51 to acquire information for performing the above-described focus detection and exposure calculation (various pieces of information for distance measurement and photometry).

Further, in step S104, the control circuit 41 outputs a control signal to the focus detection sensor 20 to cause the focus detection sensor 20 to perform signal accumulation, and when the accumulation is completed, reads out the signals accumulated in the focus detection sensor 20 and performs AD conversion on the signals to acquire digital data. The control circuit 41 at this time also performs various types of data correction such as shading on each piece of the read digital data.

Next, in step S105, the control circuit 41 calculates a focus state of each part in the imaging screen based on the information acquired from the lens control circuit 51 in step S103 and the digital data acquired from the focus detection sensor 20 in step S104. Then, the control circuit 41 determines an area to be brought into focus in the imaging screen. Here, in a case where the area to be brought into focus is specified in advance through an operation on an operation member (not illustrated) or the like provided in the camera 1, the control circuit 41 determines the specified area as the area to be brought into focus in the imaging screen. The control circuit 41 then calculates a lens movement amount to be in focus based on the focus state in the area determined in the imaging screen, and sends information indicating the calculated lens movement amount to the lens control circuit 51.

After receiving the information indicating the lens movement amount from the control circuit 41, the lens control circuit 51 outputs a signal to the second motor driver 52 so as to drive the focus lens, and drives the second motor 53. As a result, the imaging lens is focused to the subject. Further, in this case, since the output information (DT) of the distance encoder 56 is changed by driving the focus lens, the lens control circuit 51 also updates the information sent to the control circuit 41 of the camera 1.

Furthermore, in a case where information about the focus state of each part in the imaging screen is required in a state where the focus adjustment is completed, the control circuit 41 again outputs the control signal to the focus detection sensor 20 to cause the focus detection sensor 20 to perform signal accumulation. Further, when the signal accumulation in the focus detection sensor 20 is completed, the control circuit 41 performs AD conversion on the accumulated signals while reading out the signals from the focus detection sensor 20. Furthermore, the control circuit 41 performs various types of data correction such as shading on each piece of the AD-converted digital data. The control circuit 41 then calculates the focus state in each part in the imaging screen again based on the information acquired from the lens control circuit 51 and the digital data acquired from the focus detection sensor 20.

Next, in step S106, the control circuit 41 instructs the photometric sensor 26 to perform predetermined accumulation control and signal readout control. The control circuit 41 at this time determines an accumulation time in the accumulation control based on the preliminary photometric value acquired under the steady light in step S101, or the photometric value acquired at the previous accumulation by the series of processing from steps S102 to S108. As a result, in the photometric sensor 26, charge accumulation is performed for a predetermined time based on the accumulation control by the control circuit 41, and signals of a plurality of pixels are read out based on the signal readout control. Further, in the photometric sensor 26, processing is performed in which the signals of the plurality of pixels read out based on the signal readout control are subjected to AD conversion and sequentially sent to the signal processing circuit 42.

Next, in step S107, the control circuit 41 sets the signal processing circuit 42 so as to perform calculation processing for obtaining subject luminance based on the photometric signal received from the photometric sensor 26. As a result, in the signal processing circuit 42, the subject luminance calculation processing is performed based on the photometric signal from the photometric sensor 26.

Hereinbelow, specific contents of photometric signal processing and the subject luminance calculation processing performed by the signal processing circuit 42 in step S107 will be described with reference to a flowchart of FIG. 6.

Figure 6:
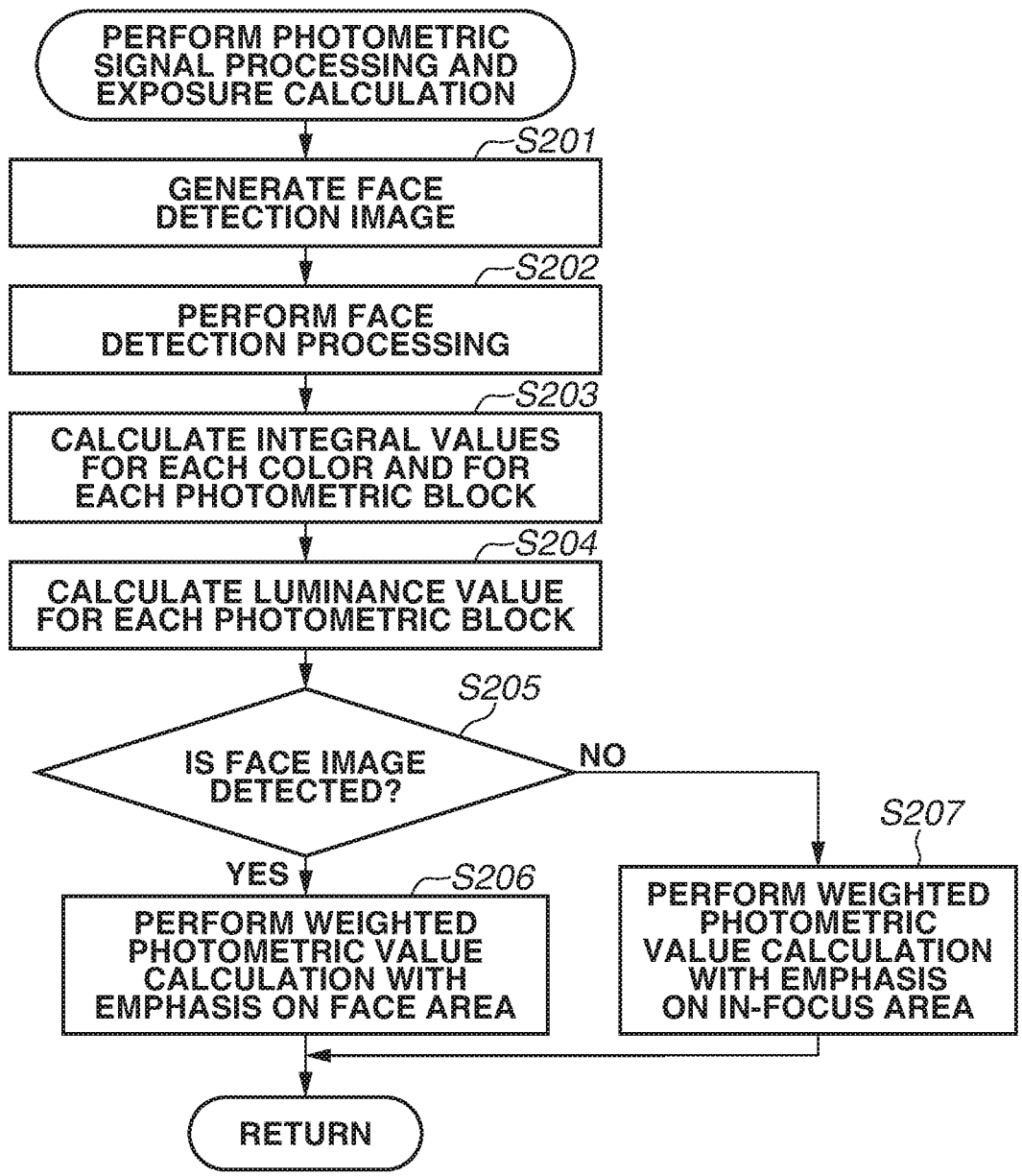
FIG. 6 is a flowchart of photometric signal processing and exposure calculation.

In step S201 in FIG. 6, the signal processing circuit 42 generates the image for detection of the subject area to be imaged using the photometric signal read out from the photometric sensor 26. In the present exemplary embodiment, an image of a face of a person is used as an example of the image of the subject area to be imaged, and a face detection image for detection of the face is generated. Although there are various methods for detecting a face from image information, in the present exemplary embodiment, a method for detecting a face by pattern matching based on a luminance image is used as an example.

The signal processing circuit 42 first performs interpolation processing for each color of R, G, and B by a well-known method on each pixel of the pixel array corresponding to a Bayer array of the photometric sensor 26 in FIG. 3B, and gives color information R(i), G(i), and B(i) for each pixel. Subsequently, the signal processing circuit 42 performs a matrix operation with predetermined coefficients (M11 to M33) on the color information R(i), G(i), and B(i) for each pixel as in Formula (1), and calculates luminance information Yr(i) and color information Cx(i) and Cy(i) for each of all the pixels. In Formula (1), i represents individual pixels among all the pixels of the photometric sensor 26. An image in which the luminance information Yr(i) calculated for each pixel by Formula (1) is arranged corresponding to each pixel position is a luminance image based on photometry by the photometric sensor 26. In step S201, the luminance image is generated as the image used for the face detection.

$$\begin{pmatrix} Yr(i) \\ Cx(i) \\ Cy(i) \end{pmatrix} = \begin{pmatrix} M11 & M12 & M13 \\ M21 & M22 & M23 \\ M31 & M32 & M33 \end{pmatrix} \times \begin{pmatrix} R(i) \\ G(i) \\ B(i) \end{pmatrix} \qquad \text{Formula (1)}$$

Next, in step S202, the signal processing circuit 42 performs face detection from the luminance image based on the luminance information Yr(i) calculated in step S201. The signal processing circuit 42 according to the present exemplary embodiment has a number of predetermined templates for performing face detection. By comparing these templates with each area of the luminance image, the signal processing circuit 42 acquires information regarding whether or not a face image exists (presence or absence of a face image) in the luminance image, and in a case where a face image is detected, information about a position, a size, and the like of the detected face image.

Next, in step S203, in order to acquire a photometric value that determines imaging exposure, the signal processing circuit 42 divides each of several tens of thousands to several hundreds of thousands of pixels of the photometric sensor 26 into blocks of about several hundreds, and calculates integral values R(j), G(j), and B(j) for each color of R, G, and B and for each block. Hereinbelow, each block divided for each number of pixels of about several hundreds is called a photometric block. j of R(j), G(j), and B(j) represents individual photometric blocks in the photometric sensor 26.

Next, in step S204, the signal processing circuit 42 multiplies the integral values R(j), G(j), and B(j) for each photometric block obtained in step S203 by predetermined coefficients n1, n2, and n3 for luminance calculation and sums the resultant values as in Formula (2) to calculate a luminance value Y(j) for each photometric block. In Formula (2), j represents the individual photometric blocks, and the predetermined coefficients n1, n2, and n3 for luminance calculation have a relationship of n1+n2+n3=1. In the present exemplary embodiment, the luminance value is converted based on settings of the accumulation time, a readout gain, and the like.

$$Y(j)=n1 \times R(j)+n2 \times G(j)+n3 \times B(j) \quad \text{Formula (2)}$$

Next, in step S205, the signal processing circuit 42 checks a result of the face detection executed in step S202. Then, in a case where the signal processing circuit 42 determines that the face image is detected (in a case where the presence of the face detection is determined) (YES in step S205), the processing proceeds to step S206, and in a case where the signal processing circuit 42 determines that no face image is detected (NO in step S205), the processing proceeds to step S207.

In the case where the processing proceeds to step S206, the signal processing circuit 42 performs weighting average processing in which weighting of a luminance value Y(j) of a photometric block corresponding to the position and the size of the detected face among all the photometric blocks of the photometric sensor 26 is increased, so that the resultant value is used as the photometric value for imaging exposure calculation. That is, in step S206, a weighted photometric value calculation with emphasis on the face area is performed. Then, based on the calculated photometric value, the signal processing circuit 42 determines an accumulation time (i.e., a shutter speed) of the image pickup element 12 and a diaphragm value optimum in the main imaging, based on a predetermined program diagram and a predetermined image pickup sensitivity, and sends information about the shutter speed and the diaphragm value to the control circuit 41. At this time, the signal processing circuit 42 also displays the determined shutter speed and diaphragm value on a screen of the display device 44, for example. In a case where one of the shutter speed or the diaphragm value is preset, the signal processing circuit 42 determines another factor that provides optimum exposure in combination with the preset value. In the present exemplary embodiment, an exposure value based on apex values of the determined shutter speed and diaphragm value is denoted as EVT. The exposure value EVT based on the apex values is represented by Formula (3). In Formula (3), Tv is the apex value of the shutter speed, and Av is the apex value of the diaphragm value.

$$EVT=Tv+Av \quad \text{Formula (3)}$$

Further, in the case where the processing proceeds to step S207, the signal processing circuit 42 performs weighting average processing in which weighting of a luminance value Y(j) of a photometric block at a position determined as the area to be brought into focus in step S105 in FIG. 5 among all the photometric blocks of the photometric sensor 26 is increased, so that the resultant value is used as the photometric value for imaging exposure calculation. That is, in step S207, a weighted photometric value calculation with emphasis on an in-focus area is performed. Then, based on the calculated photometric value, the signal processing circuit 42 determines an accumulation time (a shutter speed) of the image pickup element 12 and a diaphragm value optimum in the main imaging based on a predetermined program diagram and a predetermined image pickup sensitivity, and sends information about the shutter speed and the diaphragm value to the control circuit 41. At this time, similarly to the case in step S206, the signal processing circuit 42 also displays the determined shutter speed and diaphragm value on the screen of the display device 44. Also in step S207, similarly to the case in step S206, in a case where one of the shutter speed or the diaphragm value is preset, another factor that provides optimum exposure in combination with the preset value is determined.

When the processing of step S206 or S207 ends, the control circuit 41 returns to the flowchart of FIG. 5, and the processing proceeds to step S108.

When the processing proceeds to step S108 in FIG. 5, the control circuit 41 stands by until the release switch 48 is turned on. In a case where the release switch 48 is not turned on (NO in step S108), the control circuit 41 returns the processing to step S102, and on the other hand, in a case where it is determined that the release switch 48 is turned on (YES in step S108), the processing proceeds to step S109.

When the processing proceeds to step S109, the control circuit 41 calculates amounts of the preliminary light emission and the main light emission of a flash.

Hereinbelow, contents and control of calculation processing of the amounts of the preliminary light emission of a flash and the main light emission performed by the control circuit 41 in step S109 will be described with reference to a flowchart of FIG. 7.

Figure 7:
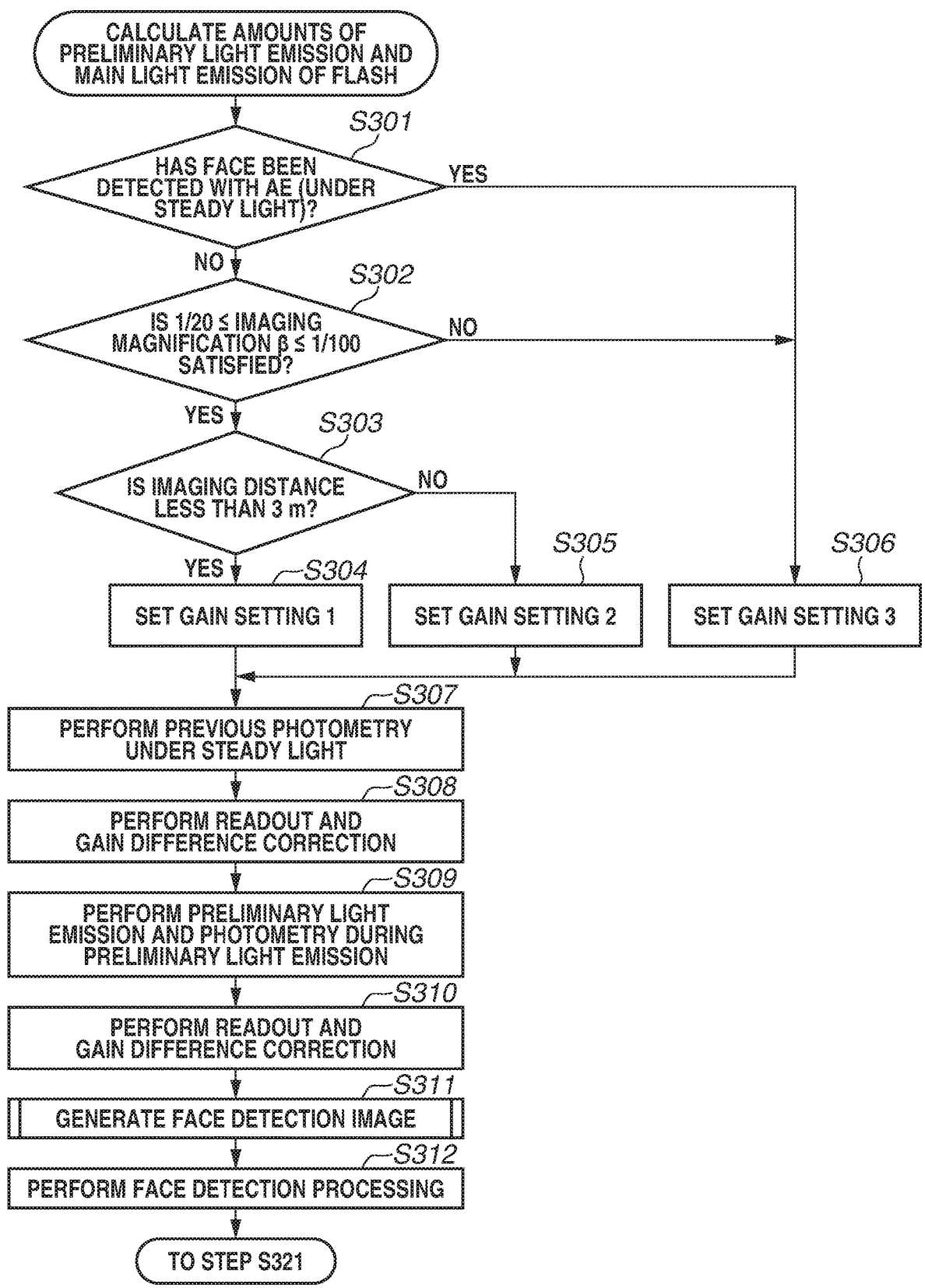
FIG. 7 is a flowchart of calculation of amounts of preliminary light emission and main light emission of a flash.

In step S301 in FIG. 7, the control circuit 41 confirms whether or not the face has been detected under only the steady light in step S205 in FIG. 6 before causing the flash device 3 to perform the preliminary light emission (pre-emission). In a case where the control circuit 41 determines that the face has been detected (YES in step S301), the processing proceeds to step S306, and in a case where the signal processing circuit 42 determines that no face has been detected (NO in step S301), the processing proceeds to step S302.

When the processing proceeds to step S302, the control circuit 41 calculates an imaging magnification β based on the focal length information of the zoom encoder 57 and the subject distance information DT of the distance encoder 56 of the interchangeable lens 2 acquired in step S103 or S105 in FIG. 5. The imaging magnification β can be calculated by dividing a focal length of the imaging lens by a subject imaging distance. The control circuit 41 then checks whether the calculated imaging magnification β is within a range of 1/20 or more and 1/100 or less. In a case where the control circuit 41 determines that the imaging magnification β is out of the range of 1/20 or more and 1/100 or less (NO in step S302), the processing proceeds to step S306, and on the other hand, in a case where the control circuit 41 determines that the imaging magnification β is within the range of 1/20 or more and 1/100 or less (YES in step S302), the processing proceeds to step S303. Here, in a case where a sensor size of the image pickup element 12 is a size corresponding to a so-called 35 mm (mm is an abbreviation for millimeter) version, assuming that imaging is performed at a distance at which a face of a person appears largely within a sensor surface, for example, it is considered that an imaging magnification at that time will be about 1/20. On the other hand, for example, assuming that imaging is performed at a distance at which the whole body of the person appears in the sensor surface, it is considered that an imaging magnification at that time will be about 1/100. Therefore, in a case where the imaging magnification β is within the range of 1/20 or more and 1/100 or less, it is considered that the imaging is highly probably performed with a person as a main subject. Accordingly, the processing proceeds to step S303.

When the processing proceeds to step S303, the control circuit 41 determines from the information (DT) of the distance encoder 56 of the interchangeable lens 2 acquired in step S105 in FIG. 5 whether short-distance imaging is performed in which an imaging distance to the main subject is less than 3 m (m is an abbreviation for meter). Then, in a case where the control circuit 41 determines that the imaging distance is not less than 3 m (NO in step S303), the processing proceeds to step S305, and in a case where the control circuit 41 determines that the imaging distance is less than 3 m (YES in step S303), the processing proceeds to step S304.

When the processing proceeds to step S304, the control circuit 41 controls a gain to be set in the photometric sensor 26 to be a "gain setting 1" in order to perform photometry during the preliminary light emission of a flash.

On the other hand, when the processing proceeds to step S305, the control circuit 41 controls a gain to be set in the photometric sensor 26 to be a "gain setting 2" in order to perform photometry during the preliminary light emission of a flash.

Further, when the processing proceeds to step S306, the control circuit 41 controls a gain to be set in the photometric sensor 26 to be a "gain setting 3" in order to perform photometry during the preliminary light emission of a flash.

Hereinbelow, specific examples of the gain settings in steps S304, S305, and S306 will be described with reference to FIGS. 8A and 8B.

Here, in one embodiment where the photometry during the preliminary light emission of a flash is performed, a photometry luminance range is enlarged. Therefore, the control circuit 41 controls the AD conversion gain control circuit 26G in FIGS. 3A and 3B to set the analog gain when the pixel signal from the pixel array 26C is subjected to AD conversion by the AD conversion circuit 26F, to one of at least two different gains for each row or pixel of the plurality of pixels. In the present exemplary embodiment, as illustrated in FIG. 8A, the control circuit 41 gives an instruction to the AD conversion gain control circuit 26G of the photometric sensor 26 to alternately switch the analog gain when the pixel signal from the pixel array 26C is subjected to AD conversion between high gain and low gain every two rows.

Figure 8:
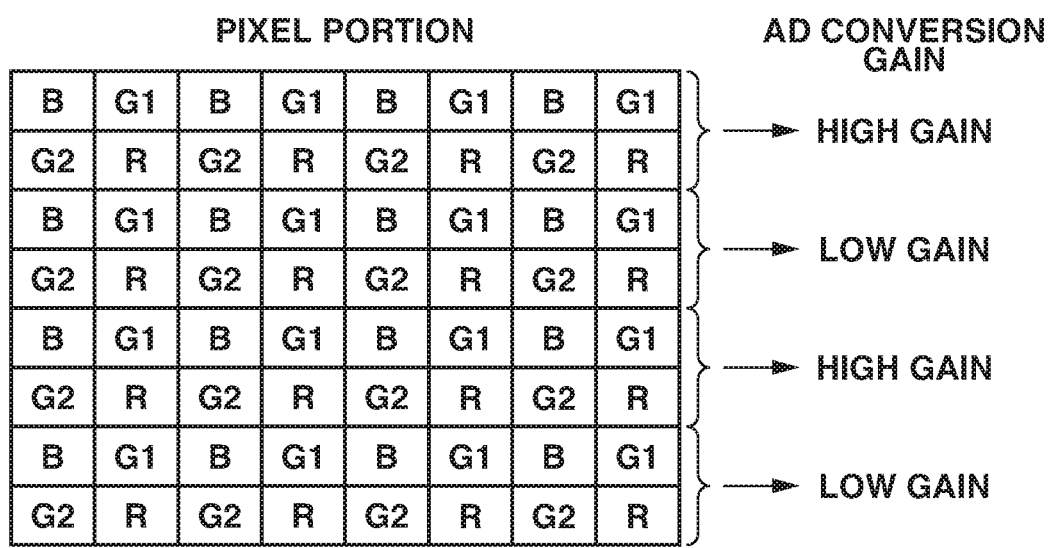
FIG. 8A is a diagram illustrating an example of a gain setting in a photometric sensor according to a first exemplary embodiment.
FIG. 8B is a diagram indicating values of gains in gain settings 1 to 3.

In the present exemplary embodiment, for example, assuming that a lowest gain that can be set is 1 times (×1), the high gain is set to 4 times (×4) and the low gain is set to 1 times (×1) in the gain setting 1, as illustrated in FIG. 8B. In the gain setting 2, the high gain is set to 16 times (×16) and the low gain is set to 4 times (×4), as illustrated in FIG. 8B, and in the gain setting 3, the high gain is set to 16 times (×16) and the low gain is set to 1 times (×1), as illustrated in FIG. 8B.

In the present exemplary embodiment, as illustrated in the flowchart of FIG. 7, the gain is set to the gain setting 1 in step S304 in a case where it is determined that no face has been detected in step S301 (NO in step S301), the imaging magnification β is within the range of 1/20 or more and 1/100 or less in step S302 (YES in step S302), and the imaging distance is less than 3 m in step S303 (YES in step S303). That is, in this case, the control circuit 41 sets the high gain to 4 times (×4) and the low gain to 1 times (×1) as the gain setting 1 as illustrated in FIG. 8B, in the photometric sensor 26.

Further, in the present exemplary embodiment, the gain is set to the gain setting 2 in step S305 in a case where it is determined that no face has been detected in step S301 (NO in step S301), the imaging magnification β is within the range of 1/20 or more and 1/100 or less in step S302 (YES in step S302), and the imaging distance is not less than 3 m in step S303 (NO in step S303). That is, in this case, the control circuit 41 sets the high gain to 16 times (×16) and the low gain to 4 times (×4) as the gain setting 2 as illustrated in FIG. 8B, in the photometric sensor 26.

Further, in the present exemplary embodiment, the gain is set to the gain setting 3 in step S306 in a case where it is determined that the face has been detected in step S301 (YES in step S301) or the imaging magnification β is not within the range of 1/20 or more and 1/100 or less in step S302 (NO in step S302). That is, in this case, the control circuit 41 sets the high gain to 16 times (×16) and the low gain to 1 times (×1) as the gain setting 3 as illustrated in FIG. 8B, in the photometric sensor 26.

Hereinbelow, a concept will be described in which the gain setting is switched among three types of settings, i.e., the gain settings 1 to 3, depending on the conditions of the presence/absence of the face detection, the imaging magnification, and the imaging distance, as described above.

In a case where photometry of reflected light from the subject is performed by performing the preliminary light emission of a flash in a predetermined amount, a photometric value to be acquired is inversely proportional to a square of the distance to the subject when an influence of reflectance or color of the subject is ignored. Here, assuming that the number of bits of the digital data acquired by performing AD conversion on each pixel signal from the photometric sensor 26 is 10 bits, the digital data can take a value within a range of 0 to 1023. In the above-described range, a valid range of the digital data that can ensure accuracy in consideration of quantization error or the like is a range of about 10 to 1000. Assuming that illuminance of the sensor of 80 lx (lx is an abbreviation of lux) to 8000 lx falls within a valid data range when the gain is set to 1 times (×1), the illuminance of the sensor of 20 lx to 2000 lx falls within the valid data range when the gain is 4 times (×4). Similarly, the illuminance of the sensor of 5 lx to 500 lx falls within the valid data range when the gain is 16 times (×16). Assuming that the illuminance of the sensor of the reflected light during the preliminary light emission in a case where the distance to the subject is 1 m is 1000 lx, photometry of the reflected light in a subject distance range of about 0.4 m to about 3.5 m can be performed when the gain is 1 times (×1). Similarly, photometry of the reflected light in a subject distance range of about 0.8 m to about 7 m can be performed when the gain is 4 times (×4), and photometry of the reflected light in a subject distance range of about 1.6 m to about 14 m can be performed when the gain is 16 times (×16).

Further, in the gain setting 1, as illustrated in FIG. 8B, the gain of 1 times (×1) and the gain of 4 times (×4) are alternately mixed. Accordingly, photometry of the reflected light in a subject distance range of about 0.4 m to about 7 m obtained by adding the subject distance ranges when the gains are 1 times (×1) and 4 times (×4) can be performed. In the gain setting 2, the gain of 4 times (×4) and the gain of 16 times (×16) are alternately mixed. Accordingly, photometry of the reflected light in a subject distance range of about 0.8 m to about 14 m obtained by adding the subject distance ranges when the gains are 4 times (×4) and 16 times (×16) can be performed. In the gain setting 3, the gain of 1 times (×1) and the gain of 16 times (×16) are alternately mixed. Accordingly, photometry of the reflected light in a subject distance range of about 0.4 m to about 14 m obtained by adding the subject distance ranges when the gains are 1 times (×1) and 16 times (×16) can be performed. Here, in the gain setting 3, although the photometry can be performed in the widest subject distance range, a difference between the two kinds of gains (the high gain and the low gain), i.e., a difference between the set sensitivities is large. Therefore, there is a possibility that a face detection image to be generated in processing of step S311 described below does not become an image suitable for the face detection. Therefore, in the present exemplary embodiment, the gain setting 3 is selected in the case where the face detection has already been performed in step S205 (YES in step S205), and in the case of the imaging magnification β in imaging which is unlikely to be performed with a person as the main subject in step S302 (in the case of being out of the range of 1/20 or more and 1/100 or less) (NO in step S302). On the other hand, the gain setting 1 is suitable for photometry when the subject is at a relatively short distance of about 0.4 m to about 7 m, and the difference between the two kinds of gains, i.e., the difference between the setting sensitivities is made small in the gain setting 1. Therefore, there is a high possibility that the face detection image to be generated in the processing of step S311 described below becomes the image suitable for the face detection. Therefore, in the present exemplary embodiment, the gain setting 1 is selected in the case where no face has been detected in step S205 (NO in step S205), but the short-distance imaging is performed in which the imaging distance is less than 3 m in consideration of the possibility that a person is the main subject in step S302. Further, the gain setting 2 is suitable for photometry when the subject is at a relatively long distance of about 0.8 m to about 14 m, and the difference between the two kinds of gains, i.e., the difference between the set sensitivities is small in the gain setting 2. Therefore, there is a high possibility that the face detection image to be generated in the processing of step S311 described below becomes the image suitable for the face detection. Therefore, in the present exemplary embodiment, the gain setting 2 is selected in the case where no face has been detected in step S205 (NO in step S205), but long-distance imaging is performed in which the imaging distance is 3 m or more in consideration of the possibility that a person is the main subject in step S302.

When the processing of any one of steps S304, S305, and S306 as described above ends, the processing proceeds to step S307.

When the processing proceeds to step S307, the control circuit 41 performs photometry immediately before the preliminary light emission of a flash, i.e., under the steady light without flash light emission. The control circuit 41 at this time performs in the photometric sensor 26 the gain setting determined in the processing of any one of steps S304, S305, and S306 as described above, and causes the photometric sensor 26 to perform signal accumulation for the same accumulation time as in the photometry during the preliminary light emission.

Next, in step S308, the control circuit 41 causes the photometric sensor 26 to input, to the signal processing circuit 42, the data obtained by reading out the signals accumulated in the pixel array 26C of the photometric sensor 26 in step S307 and performing AD conversion on the signal. Further, the control circuit 41 controls the signal processing circuit 42 to perform calculation to the digital data of the pixel signal read out at the low gain such that a value is increased by a ratio between the high gain and the low gain, and correct the sensitivity difference due to the gain difference therebetween.

Next, in step S309, the control circuit 41 performs photometry during the preliminary light emission of a flash. That is, the control circuit 41 performs the gain setting determined in the processing of any one of steps S304, S305, and S306 in the photometric sensor 26, and causes the photometric sensor 26 to perform signal accumulation for the same accumulation time as during the photometry immediately before the preliminary light emission (under the steady light). Furthermore, the control circuit 41 instructs the flash control circuit 61 to perform the preliminary light emission of a flash so that the preliminary light emission is performed in synchronization with the signal accumulation. As a result, the flash control circuit 61 causes the xenon tube serving as the light emission member 34 to emit light only in a predetermined amount of preliminary light emission based on an output signal of the light emission monitor sensor 37.

Next, in step S310, the control circuit 41 causes the photometric sensor 26 to input, to the signal processing circuit 42, the data obtained by reading out the signals accumulated in the pixel array 26C of the photometric sensor 26 in step S309 and performing AD conversion on the signal. Further, similar to the case in step S308, the control circuit 41 controls the signal processing circuit 42 to perform calculation to the digital data of the pixel signal read out at the low gain such that a value is increased by a ratio between the high gain and the low gain, and correct the sensitivity difference (gain difference).

Next, in step S311, the control circuit 41 controls the signal processing circuit 42 to generate a face detection image based on the signals accumulated and read out by the photometric sensor 26 during the preliminary light emission of a flash.

Hereinbelow, specific generation processing of the face detection image performed by the signal processing circuit 42 in step S311 will be described with reference to a flowchart of FIG. 9.

Figure 9:
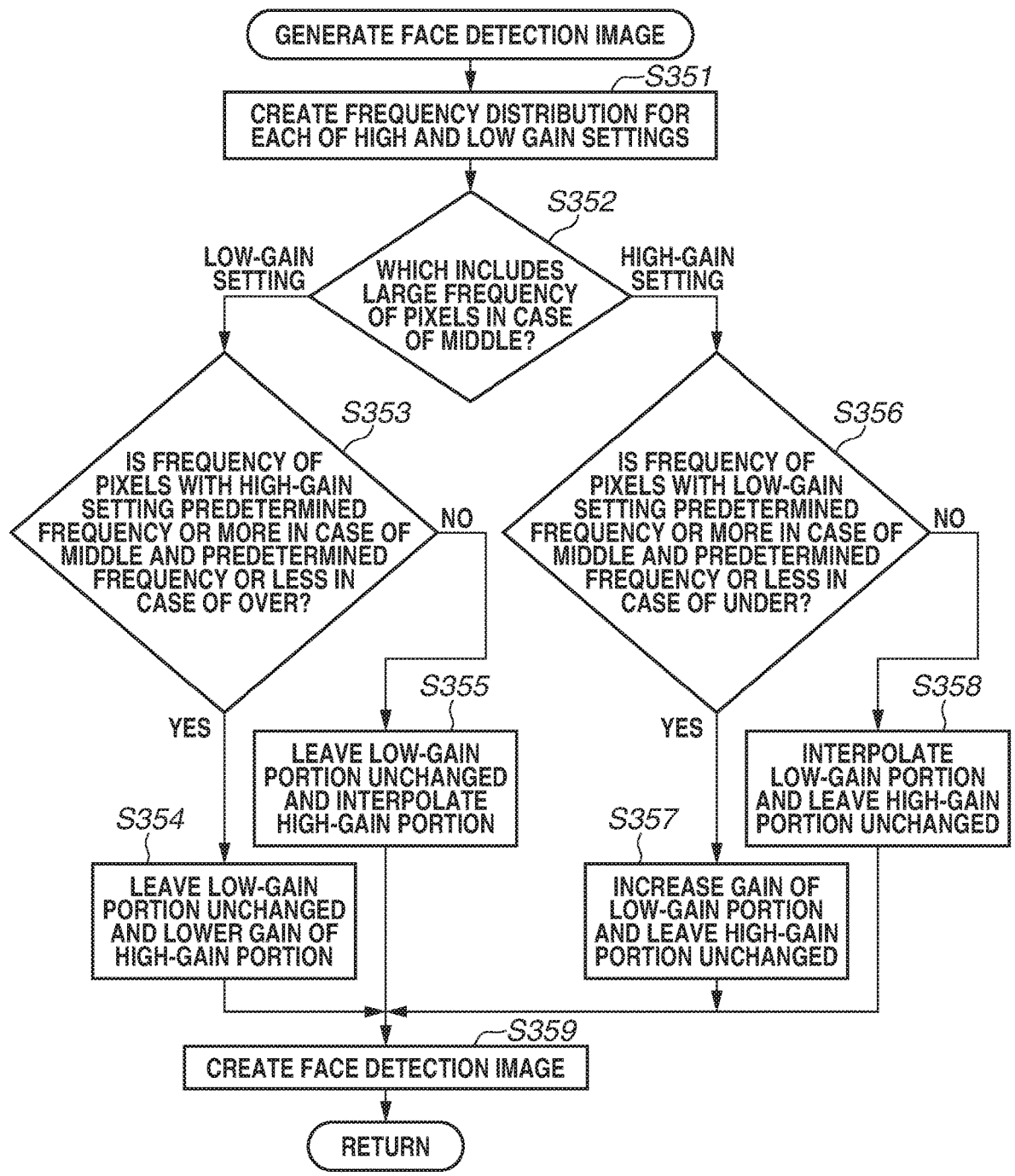
FIG. 9 is a flowchart of generation of a face detection image.

In step S351 in FIG. 9, the signal processing circuit 42 creates frequency distribution of output values for each pixel unit and for each of the gain settings of the high gain and the low gain based on the signals during the preliminary light emission input in step S310 in FIG. 7. Further, the signal processing circuit 42 classifies the created frequency distribution based on three conditions, that is, cases where the output value for each pixel unit is too low (under), medium (middle), and too high (over).

Next, in step S352, with respect to the frequency distribution created in step S351, the signal processing circuit 42 compares distribution of pixels with a high-gain setting and distribution of pixels with a low-gain setting to determine which distribution includes a large frequency of the pixels in the case of medium (middle). Then, in a case where the signal processing circuit 42 determines that the frequency of the pixels with the high-gain setting included in the case of medium (middle) is larger (HIGH-GAIN SETTING in step S352), the processing proceeds to step S356. On the other hand, in a case where the signal processing circuit 42 determines that the frequency of the pixels with the low-gain setting included in the case of medium (middle) is larger (LOW-GAIN SETTING in step S352), the processing proceeds to step S353.

Figure 10A:
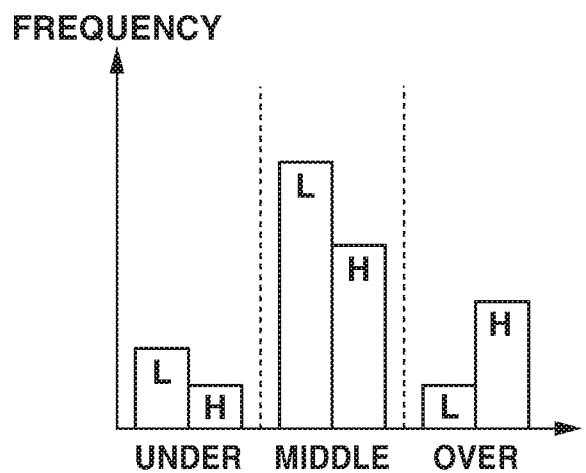
FIG. 10A is a diagram illustrating an example of frequency distribution of a photometric signal during preliminary light emission.

When the processing proceeds to step S353, the signal processing circuit 42 determines whether a condition is satisfied where the frequency of the pixels included in the case of medium (middle) is a predetermined frequency or more, and the frequency of the pixels included in the case of too high (over) is the predetermined frequency or less, in the distribution of the pixels with the high-gain setting. The frequency distribution that satisfies the condition is distribution as illustrated in FIG. 10A, for example. In FIGS. 10A to 10D, frequency distribution L is the frequency distribution of the pixels with the low-gain setting, and frequency distribution H is the frequency distribution of the pixels with the high-gain setting. In a case where the signal processing circuit 42 determines that the condition of step S353 is not satisfied (NO in step S353), the processing proceeds to step S355, and in a case where the signal processing circuit 42 determines that the condition is satisfied (YES in step S353), the processing proceeds to step S354.

Here, the condition of step S353 is satisfied in a case where the pixels with the low-gain setting include more middle pixels having neither saturation nor an underexposure, but it is not necessarily the case that the most of the pixels with the high-gain setting are saturated. Accordingly, when the processing proceeds to step S354, the signal processing circuit 42 performs calculation processing corresponding to reducing, by digital processing, a sensitivity of information about the pixels with the high-gain setting to match a sensitivity of information about the pixels with the low-gain setting, and corrects the image having different sensitivities which are alternately set to an image having a uniform sensitivity.

Figure 10B:
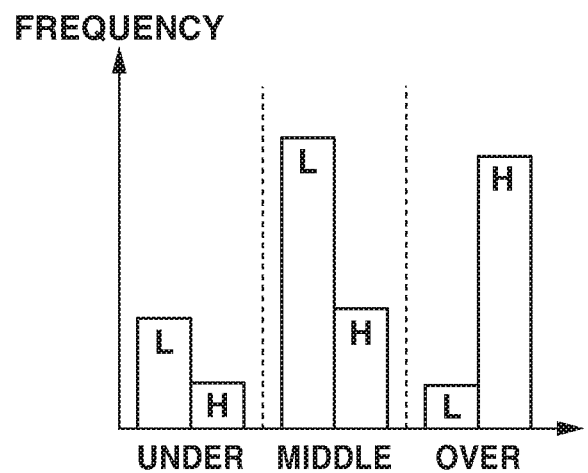
FIG. 10B is a diagram illustrating another example of the frequency distribution of the photometric signal during the preliminary light emission.

On the other hand, the condition of step S353 is not satisfied in a case where the pixels with the low-gain setting include more middle pixels having neither saturation nor an underexposure, but the pixels with the high-gain setting include more saturated pixels due to the high gain, as illustrated in FIG. 10B. Accordingly, when the processing proceeds to step S355, the signal processing circuit 42 performs interpolation processing on the pixels with the high-gain setting based on the peripheral pixels with the low-gain setting, and corrects the image having different sensitivities which are alternately set to an image having a uniform sensitivity.

Figure 10C:
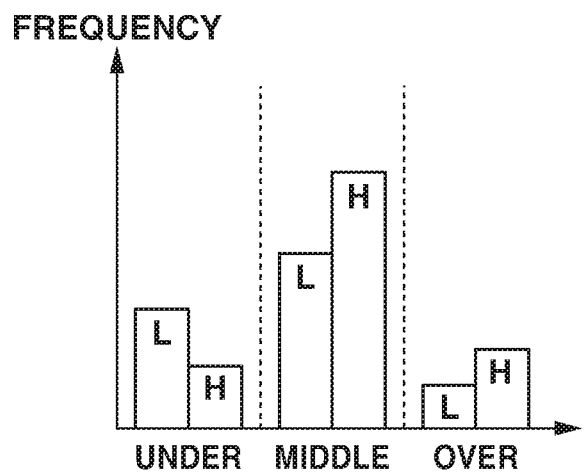
FIG. 10C is a diagram illustrating still another example of the frequency distribution of the photometric signal during the preliminary light emission.

Further, when the processing proceeds to step S356, the signal processing circuit 42 determines whether a condition is satisfied where in the distribution of the pixels with the low-gain setting, the frequency of the pixels included in the case of medium (middle) is a predetermined frequency or more, and the frequency of the pixels included in the case of too low (under) is the predetermined frequency or less. The frequency distribution that satisfies the condition is distribution as illustrated in FIG. 10C, for example. Then, in a case where the signal processing circuit 42 determines that the condition not is satisfied (NO in step S356), the processing proceeds to step S358, and in a case where the signal processing circuit 42 determines that the condition is satisfied (YES in step S356), the processing proceeds to step S357.

Here, the condition of step S356 is satisfied in a case where the pixels with the high-gain setting include more middle pixels having neither saturation nor an underexposure, but it is not necessarily the case that the most of the pixels with the low-gain setting have the underexposure. Accordingly, when the processing proceeds to step S357, the signal processing circuit 42 performs calculation processing corresponding to increasing, by the digital processing, the sensitivity of the information about the pixels with the low-gain setting to match the sensitivity of the information about the pixels with the high-gain setting, and corrects the image having different sensitivities which are alternately set to an image having a uniform sensitivity.

Figure 10D:
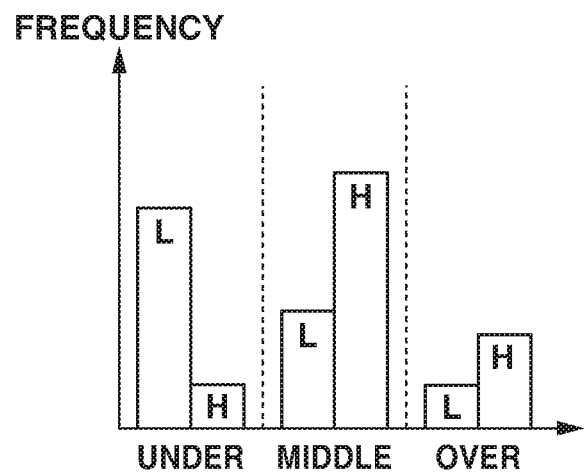
FIG. 10D is a diagram illustrating still another example of the frequency distribution of the photometric signal during the preliminary light emission.

On the other hand, the condition of step S356 is not satisfied in a case where the pixels with the high-gain setting include more middle pixels having neither saturation nor an underexposure, but the pixels with the low-gain setting include more pixels having the underexposure due to the low gain, as illustrated in FIG. 10D. Accordingly, when the processing proceeds to step S358, the signal processing circuit 42 performs interpolation processing on the pixels with the low-gain setting based on the peripheral pixels with the high-gain setting, and corrects the image having different sensitivities which are alternately set to an image having a uniform sensitivity.

When the processing of any one of steps S354, S355, S357, and S358 is completed, the processing proceeds to step S359.

When the processing proceeds to step S359, the signal processing circuit 42 generates a face detection image from the image corrected in any one of steps S354, S355, S357, and S358. Here, similar to the case in the above-described step S201, the interpolation processing for each color of R, G, and B is performed first by a well-known method on each pixel of the pixel array in a Bayer array of the photometric sensor 26 in FIG. 3B, and the color information R, G, and B is given for each pixel. Further, in a similar manner as described above, the matrix operation with the predetermined coefficients (M11 to M33) is performed on the color information R(i), G(i), and B(i) for each pixel by Formula (1), and the luminance information Yr(i) and the color difference information Cx(i) and Cy(i) are generated for each pixel to obtain face detection image information.

Then, when the processing of step S359 by the signal processing circuit 42 is completed, the processing proceeds to step S312 in FIG. 7.

Figure 11:
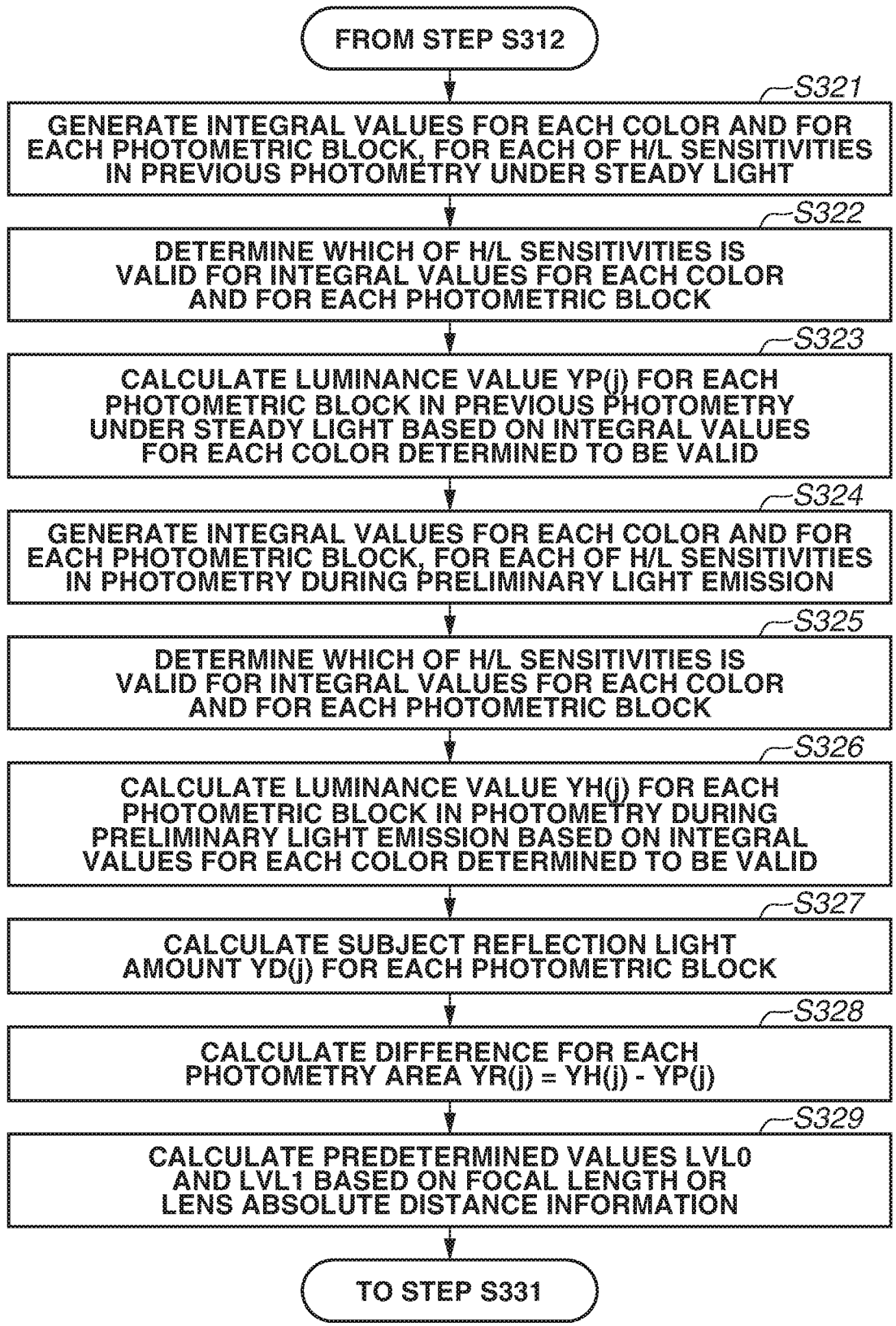
FIG. 11 is a flowchart of calculation of the amount of the preliminary light emission according to the first exemplary embodiment.

When the processing proceeds to step S312 in FIG. 7, the control circuit 41 causes the signal processing circuit 42 to perform face detection processing similar to that in step S202 as described above, from the face detection image generated as described above. Thereafter, the processing proceeds to step S321 of a flowchart of FIG. 11. The processing of the flowchart of FIG. 11 may be performed by the control circuit 41 or may be performed by the signal processing circuit 42 under control of the control circuit 41. Here, it is assumed that the processing of the flowchart of FIG. 11 is performed by the control circuit 41.

When the processing proceeds to step S321, the control circuit 41 performs integration (addition) processing on the pixel signal immediately before the preliminary light emission (under the steady light) read out and acquired from the photometric sensor 26 at step S308 described above for each of the high gain and the low gain, for each color of R, G, and B, in each predetermined photometric block. Data obtained as a result of the integration (addition) processing is a high gain RPH(j) of R, a high gain GPH(j) of G, a high gain BPH(j) of B, a low gain RPL(j) of R, a low gain GPL(j) of G, and a low gain BPL(j) of B. j represents each photometric block of the photometric sensor 26 described above.

Next, in step S322, the control circuit 41 determines, for each photometric block of the photometric sensor 26, which one of the high gain RPH(j) and the low gain RPL(j) is valid, which one of the high gain GPH(j) and the low gain GPL(j) is valid, and which one of the high gain BPH(j) and the low gain BPL(j) is valid. Specifically, in each photometric block, between the integral values (additional values) for each color corresponding to each of the high gain and the low gain, one including the smaller number of the pixels having a value after AD conversion regarded as having saturation or an underexposure is determined to be valid data. Further, the control circuit 41 integrates (adds) the one determined to be valid in each photometric block for each color of R, G, and B, and sets the integral value (additional value) for each color of R, G, and B to RP(j), GP(j), and BP(j), respectively.

Next, in step S323, the control circuit 41 calculates a luminance value YPr(j) of the subject based on the integral values RP(j), GP(j), and BP(j) for the colors of R, G, and B obtained for each photometric block, as in Formula (4). In Formula (4), in a similar manner as described above, j represents the individual photometric blocks of the photometric sensor 26, and the coefficients n1, n2, and n3 for luminance calculation have a relationship of n1+n2+n3=1.

$$YPr(j)=n1 \times RP(j)+n2 \times GP(j)+n3 \times BP(j) \qquad \text{Formula (4)}$$

Further, by using luminance information YPr(j) immediately before the preliminary light emission in a linear system, the control circuit 41 performs conversion function processing to a logarithmic compression system having 2 as a base and correction processing Q on luminance information for each screen area based on optical characteristics such as lens information to obtain luminance information YP(j) in the logarithmic compression system. For example, the control circuit 41 obtains the luminance information YP(j) in the logarithmic compression system from Formula (5).

$$YP(j)=\log_2\{YPr(j)\} \times Q(j) \qquad \text{Formula (5)}$$

Next, in step S324, using the pixel signal during the preliminary light emission, input from the photometric sensor 26 in step S310, the control circuit 41 performs addition processing for each of the high gain and the low gain, for each color of R, G, and B, in each predetermined photometric block. Data obtained as a result of the addition processing is a high gain RHH(j) of R, a high gain GHH(j) of G, a high gain BHH(j) of B, a low gain RHL(j) of R, a low gain GHL(j) of G, and a low gain BHL(j) of B.

Next, in step S325, the control circuit 41 determines, for each photometric block of the photometric sensor 26, which one of the high gain RHH(j) and the low gain RHL(j) is valid, which one of the high gain GHH(j) and the low gain GHL(j) is valid, and which one of the high gain BHH(j) and the low gain BHL(j) is valid. A method of determination is similar to that in step S322. Further, the control circuit 41 integrates (adds) the one determined to be valid in each photometric block for each color of R, G, and B, and sets the integral value (additional value) for each color of R, G, and B to RH(j), GH(j), and BH(j), respectively.

Next, in step S326, the control circuit 41 calculates a luminance value YHr(j) based on the integral values RH(j), GH(j), and BH(j) for the colors of R, G, and B obtained for each photometric block, as illustrated in Formula (6). In Formula (6), j, n1, n2, and n3 are as described above.

$$YHr(j)=n1 \times RH(j)+n2 \times GH(j)+n3 \times BH(j) \qquad \text{Formula (6)}$$

Further, in a similar manner as described above, by using luminance information YHr(j) immediately before the preliminary light emission in a linear system, the control circuit 41 performs conversion function processing to a logarithmic compression system and correction processing Q on luminance information for each screen area based on optical characteristics such as lens information to obtain luminance information YH(j) in the logarithmic compression system. The control circuit 41 in this case obtains the luminance information YH(j) in the logarithmic compression system from Formula (7).

$$YH(j)=\log_2\{YHr(j)\} \times Q(j) \qquad \text{Formula (7)}$$

Next, in step S327, the control circuit 41 calculates a luminance value YD(j) of only the reflected light of flash light during the preliminary light emission based on the luminance information YP(j) immediately before the preliminary light emission and the luminance information YH(j) during the preliminary light emission, for each photometric block. Here, each of the luminance information YP(j) immediately before the preliminary light emission and the luminance information YH(j) during the preliminary light emission is a value in the compression system. Therefore, the control circuit 41 performs calculation of Formula (8) by obtaining a difference after operating on the exponentiated numbers to expand the values, and then performing logarithmic compression of the difference value.

$$YD(j)=\log_2(2^{YH(j)}-2^{YP(j)}) \qquad \text{Formula (8)}$$

Next, in step S328, the control circuit 41 calculates a difference YR(j) in the luminance values from Formula (9) based on the luminance information YP(j) immediately before the preliminary light emission and the luminance information YH(j) during the preliminary light emission, for each photometric block.

$$YR(j)=YH(j)-YP(j) \qquad \text{Formula (9)}$$

Here, since each of the luminance information YP(j) immediately before the preliminary light emission and the luminance information YH(j) during the preliminary light emission is a value in the logarithmic compression system, obtaining the difference therebetween is equivalent to obtaining a ratio of the luminance values. The reason why the ratio of the luminance values is obtained is that an area in which values of the ratio of the luminance values coincide in each photometric block can be considered as an area in which distances to the subject coincides as disclosed in Japanese Patent Application Laid-Open No. 2005-275265, for example.

Next, in step S329, the control circuit 41 acquires the subject distance information DT and calculates predetermined values LVL0 and LVL1 based on the subject distance information DT. The processing of step S329 may be performed by the control circuit 41. The predetermined value LVL0 is calculated in consideration of reflection luminance of the subject with standard reflectance at the distance based on the subject distance information DT obtained from the lens control circuit 51 in step S103 or S105 described above and information indicating the amount of light emission during the preliminary light emission (referred to as emitted light amount information EL). The predetermined value LVL0 is determined to be a value slightly higher than the reflection luminance of the subject with the standard reflectance based on the subject distance information DT. This is for increasing, in consideration of the fact that the subject distance information DT actually has some error, the predetermined value LVL0 by the amount corresponding to the error, and preventing the actual reflected light during the preliminary light emission in the subject with the standard reflectance from becoming higher than the predetermined value LVL0. The predetermined value LVL0 can be obtained from Formula (10), for example.

$$LVL0=-\log_2(DT) \times 2+EL \qquad \text{Formula (10)}$$

On the other hand, the predetermined value LVL1 is determined by subtracting a predetermined value RVL from the predetermined value LVL0. In order to prevent the actual reflected light during the preliminary light emission of the subject with the standard reflectance from becoming lower than the predetermined value LVL1, the predetermined value RVL is determined to be a value having a relationship of Formula (11), for example, in consideration of the error or the like in the subject distance information DT.

$$LVL1=LVL0-RVL \qquad \text{Formula (11)}$$

Figure 12:
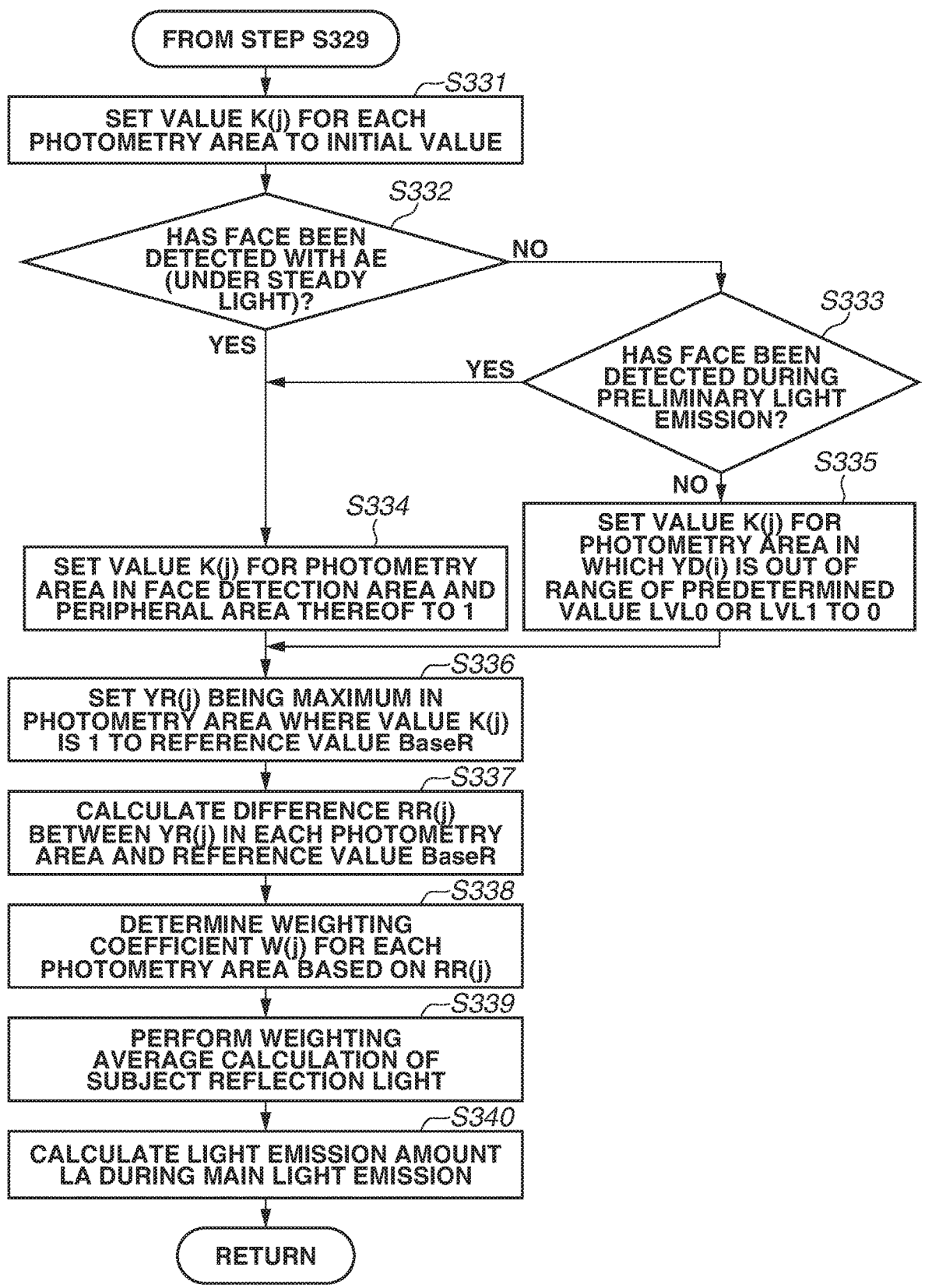
FIG. 12 is a flowchart of calculation of the amount of the main light emission.

Then, on a premise that the reflected light during the preliminary light emission of the subject normally falls between the predetermined values LVL0 and LVL1 based on the subject distance information DT as described above, calculation for determining the amount of the main light emission of a flash as illustrated in a flowchart of FIG. 12 below is performed. The calculation processing for determining the amount of the main light emission of a flash in FIG. 12 may be performed by the control circuit 41 or may be performed by the signal processing circuit 42 under control of the control circuit 41. Here, it is assumed that the processing of the flowchart of FIG. 12 is performed by the control circuit 41. That is, when the processing of step S329 in FIG. 11 ends, the processing proceeds to step S331 of the flowchart of FIG. 12.

When the processing proceeds to step S331 in FIG. 12, the control circuit 41 sets to a predetermined default value a coefficient K(j) that limits an option area for selecting a reference value BaseR described below. As the coefficient K(j), a value 0 or a value 1 is set for each of all the photometric blocks. Here, as the default value to be set, the value 0 is normally set for a photometric block corresponding to a peripheral portion of the imaging screen, which is unlikely to have the main subject, and the value 1 is set for the other photometric blocks.

Next, in step S332, the control circuit 41 checks whether a face has been detected in the face detection processing performed under the steady light in step S202 in FIG. 6 described above. In a case where the control circuit 41 determines that a face has been detected under the steady light (YES in step S332), the processing proceeds to step S334, and in a case where the control circuit 41 determines that no face has been detected (NO in step S332), the processing proceeds to step S333.

When the processing proceeds to step S333, the control circuit 41 checks whether a face has been detected in the face detection processing performed during the preliminary light emission in step S312 in FIG. 7 described above. In a case where the control circuit 41 determines that a face has been detected during the preliminary light emission (YES in step S333), the processing proceeds to step S334, and in a case where the control circuit 41 determines that no face has been detected (NO in step S333), the processing proceeds to step S335.

When the processing proceeds to step S334, the control circuit 41 corrects the coefficient K(j) set to the default value in step S331 based on face position information or face size information detected in the face detection processing performed under the steady light in step S202 or the face detection processing performed during the preliminary light emission in step S312 described above. In the correction processing, the value 1 is set for a photometric block including a face or a photometric block close to a face position, and the value 0 is set for the other photometric blocks.

On the other hand, when the processing proceeds to step S335, the control circuit 41 compares the luminance value YD(j) for each photometric block calculated in step S327 in FIG. 11 described above with the predetermined values LVL0 and LVL1 calculated in step S329 in FIG. 11 described above. Then, in the case where there is an area where the condition YD(j)>LVL0 or YD(j)<LVL1 is satisfied, the control circuit 41 sets the coefficient K(j) of the area to 0. As a result, the coefficient K(j) becomes 0 in an area where the luminance value YD(j) is abnormally high due to regular reflection from a specular object such as glass, or an area which is so far that the flash light does not reach and where the luminance value YD(j) is very low accordingly. The control circuit 41 leaves the coefficient K(j) at 0 in the area where K(j)=0 as the default in step S331 described above.

Next, in step S336, the control circuit 41 selects an area where the value of a ratio YR(j) of the luminance values becomes maximum among the photometric blocks in which K(j)=1, and set the area to a reference area. The value of the ratio YR(j) of the luminance values in the reference area is referred to as the reference value BaseR, and an area where the reference value BaseR and the value of the ratio YR(j) are the same is set to a main subject area.

Next, in step S337, the control circuit 41 calculates a difference RR(j) between the ratio YR(j) of the luminance values and the reference value BaseR in all the photometric blocks from Formula (12).

$RR(j)=\text{Base}R-YR(j)$     Formula (12)

Here, since the ratio YR(j) of the luminance values and the reference value BaseR both are values in the logarithmic compression system, calculating the difference RR(j) corresponds to calculating a ratio between the ratio YR(j) in the reference area and the ratio YR(j) in the other areas. A photometry area where the value of the difference RR(j) becomes small is assumed to be the main subject area, and in the area, the subject exists at approximately the same distance as the subject in the area where the value becomes the reference value BaseR. On the other hand, a photometry area where the value of the difference RR(j) becomes large in a positive direction is assumed to be a main subject area, and in the area, the subject can be assumed to exist farther away than the subject in the area where the value becomes the reference value BaseR. In contrast, a photometry area where the value of the difference RR(j) becomes large in a negative direction is assumed as a main subject area, and in the area, the subject can be assumed to exist closer than the subject in the area where the value becomes the reference value BaseR. That is, it is considered that such areas are an area where an object other than the main subject exists in front of the main subject, or an area where an abnormally high amount of the reflected light is obtained from a mirror surface of glass or the like.

Next, in step S338, the control circuit 41 determines a weighting coefficient W(j) based on the difference RR(j) calculated in all the photometric blocks. The weighting coefficient W(j) is increased as an absolute value of the value of the difference RR(j) decreases, and decreased as the absolute value of the value of the difference RR(j) increases, similar to the description in Japanese Patent Application Laid-Open No. 2005-275265, for example.

Next, in step S339, the control circuit 41 performs weighting calculation of the reflected light of the subject in all the photometric blocks. The control circuit 41 then calculates, from Formula (13), an average value AVE of reflected light of an entire screen weighting of which is increased in the area where the subject is assumed to exist at the same distance as the subject in an area assumed to be the main subject area based on the weighting calculation.

$\text{AVE}=\Sigma(YD(j)\times W(j))/\Sigma W(j)$     Formula (13)

Next, in step S340, the control circuit 41 calculates, from Formula (14), a light emission amount LA during the main light emission based on the exposure value EVT determined in step S107 and the average value AVE calculated in step S339 described above. The light emission amount LA is a relative value of the main light emission with respect to a flash light emission amount during the preliminary light emission.

$LA=EVT-\text{AVE}$     Formula (14)

The value of the light emission amount LA is then sent from the control circuit 41 to the flash control circuit 61, and by the main light emission with the light emission amount based on the value performed in step S111 described below, image pickup is performed with a desired flash light emission amount. After the processing of step S340, the processing proceeds to step S110 in FIG. 5.

When the processing proceeds to step S110, the control circuit 41 outputs a control signal to the first motor driver 46 to drive the first motor 47 so that the main mirror 13 and the first reflection mirror 14 jump up.

Subsequently, the control circuit 41 outputs diaphragm value information calculated in step S107 described above to the lens control circuit 51. Based on the information, the lens control circuit 51 outputs a signal to the third motor driver 54 to drive the diaphragm 31, and drives the third motor 55. As a result, the imaging lens becomes a diaphragm closed state corresponding to the set diaphragm value.

Next, in step S111, the control circuit 41 outputs a signal to the shutter drive mechanism 49 to bring the mechanical shutter 10 into an open state. As a result, a light beam from the imaging lens is incident on the image pickup element 12 and image pickup can be performed. Thereafter, the control circuit 41 gives an instruction to the signal processing circuit 42 so that the image pickup element 12 is set to the accumulation time based on a shutter time calculated in step S107 described above and the readout gain based on a predetermined image pickup sensitivity, and signal accumulation is performed. Further, the control circuit 41 gives a flash light emission instruction to the flash control circuit 61 in synchronization with the image pickup timing. In accordance with the light emission instruction, the flash control circuit 61 causes the xenon tube serving as the light emission member 34 to emit light based on the output signal of the light emission monitor sensor 37 such that the light emission amount corresponds to the light emission amount LA calculated in step S109. As a result, the main image pickup accompanied by the main light emission of a flash is performed.

Then, when the main image pickup is completed, the control circuit 41 outputs a signal to the shutter drive mechanism 49 to bring the mechanical shutter 10 into a light-shielding state. As a result, the light beam from the imaging lens to the image pickup element 12 are shielded.

Next, in step S112, the control circuit 41 outputs information to the lens control circuit 51 so as to open the diaphragm 31. Based on the information, the lens control circuit 51 outputs a signal to the third motor driver 54 to drive the diaphragm 31, and drives the third motor 55. As a result, the imaging lens becomes a diaphragm open state. Further, the lens control circuit 51 outputs a control signal to the first motor driver 46 to drive the first motor 47 so that the main mirror 13 and the first reflection mirror 14 are to be lowered.

Next, in step S113, the control circuit 41 instructs the signal processing circuit 42 to read out from the image pickup element 12 picked-up image information while performing AD conversion thereon, and perform correction processing and interpolation processing.

Next, in step S114, the control circuit 41 instructs the signal processing circuit 42 to perform white balance adjustment of the picked-up image information. The signal processing circuit 42 at this time divides one screen of the picked-up image information into a plurality of areas, and extracts a white area of the subject based on a color difference signal for each divided area. Further, the signal processing circuit 42 performs white balance adjustment by performing gain correction of a red (R) channel and a blue (B) channel of the entire screen based on the signal of the extracted area.

Next, in step S115, the control circuit 41 instructs the signal processing circuit 42 to compress and convert the picked-up image information subjected to the white balance adjustment into a recording file format and store the compressed and converted picked-up image information in the memory circuit 45.

Thus, a series of imaging sequence ends.

Although it is determined whether or the face has been detected under the steady light in step S301 described above in the present exemplary embodiment, the face detection may take time depending on conditions. Therefore, in a case of the condition where the face detection is not completed while the processing proceeds from steps S205 to S301, the presence/absence of the face detection may be determined under a luminance condition or a degree of backlight where it may be difficult to perform the face detection based on the photometry result under the steady light performed in step S107. In this case, when luminance is too low or backlight is too strong to perform the face detection, the processing proceeds to step S302, and otherwise, the processing proceeds to step S306.

As described above, in the first exemplary embodiment, when a reflected light from a subject is measured during preliminary light emission of flash photography, a photometry luminance range can be enlarged, and a face of a person can be detected from image information obtained by performing photometry of the reflected light of the subject. Further, in the present exemplary embodiment, image quality for detection of the subject (a face or the like) is secured in an image generated from a photometric signal of the reflected light of the subject or the like. Therefore, in the present exemplary embodiment, it is possible to increase probability that an amount of main light emission of a flash during portrait imaging becomes appropriate.

Figure 13A:
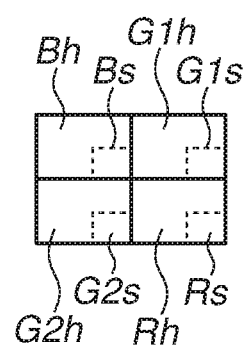
FIG. 13A is a diagram illustrating an example of a pixel configuration in a Bayer unit of a photometric sensor according to a second exemplary embodiment.
Figure 13B:
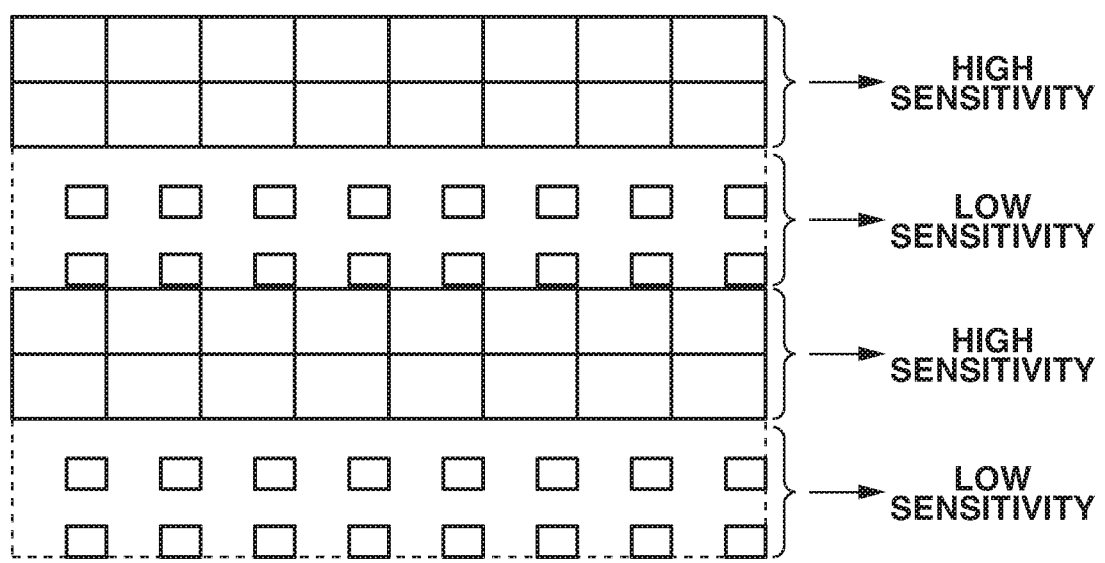
FIG. 13B is a diagram used for description of a high-sensitivity pixel and a low-sensitivity pixel of the photometric sensor according to the second exemplary embodiment.

In the first exemplary embodiment, an example has been described in which an analog gain when a pixel signal is subjected to AD conversion is set to be alternately high gain/low gain every two rows as a technique for enlarging the photometry luminance range in a case of performing photometry during the preliminary light emission of a flash. In a second exemplary embodiment, functions similar to those of the first exemplary embodiment are implemented also by providing a photometric sensor 26 with a high-sensitivity pixel and a low-sensitivity pixel due to a difference in a light reception area. With reference to FIGS. 13A and 13B, the photometric sensor 26 according to the second exemplary embodiment will be described. Since configurations and flowcharts of a camera 1, an interchangeable lens 2, and a flash device 3 are substantially the same as those of the above-described configurations and flowcharts, the illustration and description thereof will be omitted.

FIG. 13A illustrates a pixel configuration of one Bayer unit in a pixel array 26C in the photometric sensor 26 according to the second exemplary embodiment. A pixel that receives light transmitting through a blue transmission filter (B) is divided into a pixel Bh having a large area and a pixel Bs having a small area. Further, a pixel that receives light transmitting through a green transmission filter (G1) is divided into a pixel G1h having a large area and a pixel G1s having a small area, and a pixel that receives light transmitting through a green transmission filter (G2) is divided into a pixel G2h having a large area and a pixel G2s having a small area. Similarly, a pixel that receives light transmitting through a red transmission filter (R) is divided into a pixel Rh having a large area and a pixel Rs having a small area.

Then, in the second exemplary embodiment, in the pixel that receives the light transmitting through the blue transmission filter (B), in a case where the pixel is set as the high-sensitivity pixel, signal charges accumulated in the large pixel Bh and the small pixel Bs are added and read out. On the other hand, in a case where the pixel is set as the low-sensitivity pixel, signal charges accumulated only in the small pixel Bs are read out. In this manner, in the second exemplary embodiment, a photometry luminance range can be enlarged with a sensitivity difference corresponding to a ratio of a total area of the large pixel Bh and the small pixel Bs to a single area of the small pixel Bs. The same applies to the pixel that receives the light transmitting through the green transmission filters (G1 and G2) and the pixel that receives the light transmitting through the red transmission filter (R).

According to the second exemplary embodiment, by changing a sensitivity setting for each area in the photometric sensor 26 having such a pixel configuration, a high-sensitivity area and a low-sensitivity area can be alternately provided, as illustrated in FIG. 13B. Also in the second exemplary embodiment, a face detection image is generated from an image during preliminary light emission of a flash read out from the photometric sensor 26 having the sensitivity setting as described above. In the second exemplary embodiment, calculation processing is performed corresponding to reducing, by the sensitivity difference due to the area ratio, a sensitivity of information about the pixels with a high-sensitivity setting to match a sensitivity of information about the pixels with a low-sensitivity setting, by digital processing in step S354 in FIG. 9. Then, the image having different sensitivities which are alternately set is corrected to an image having a uniform sensitivity. Further, in the second exemplary embodiment, calculation processing is performed corresponding to increasing, by the sensitivity difference due to the area ratio, a sensitivity of information about the pixels with the low-sensitivity setting to match a sensitivity of information about the pixels with the high-sensitivity setting, by digital processing in step S357 in FIG. 9. Then, the image having different sensitivities which are alternately set is corrected to an image having a uniform sensitivity.

A third exemplary embodiment will be described. A technique discussed in Japanese Patent No. 5610961 or Japanese Patent No. 5893550 can also be applied to the method of enlarging the photometry luminance range in the case of performing the photometry during the preliminary light emission of a flash as described above. In the technique of Japanese Patent No. 5610961, an AD converter performs AD conversion for all pixel data with a first gain and a second gain higher than the first gain, and compares both of the converted data to select the optimum one. In the technique of Japanese Patent No. 5893550, the AD converter compares a signal output from an amplifier circuit with a predetermined reference signal, selects a gain of the amplifier circuit from a first gain and a second gain higher than the first gain, and performs AD conversion on a signal in which an optimum amplification gain is selected for each pixel.

In the third exemplary embodiment, a technique discussed in Japanese Patent No. 5610961 or Japanese Patent No. 5893550 is applied to a photometric sensor 26. Since the other configurations in FIGS. 1, 2, and 4 are the same as those in the first exemplary embodiment, the description thereof will be omitted. Therefore, in the third exemplary embodiment, the photometric sensor 26 includes the AD converter discussed in Japanese Patent No. 5610961 or the AD converter and the amplifier circuit discussed in Japanese Patent No. 5893550.

Further, regarding an operation flowchart of the third exemplary embodiment, processing of the flowchart of FIG. 16 described below is executed instead of the processing of the flowchart of FIG. 11 of the first exemplary embodiment, and processing of the flowchart of FIG. 17 described below is executed instead of the processing of the flowchart of FIG. 9 of the first exemplary embodiment. Hereinbelow, the third exemplary embodiment will be specifically described with respect to different portions from the first exemplary embodiment.

FIG. 14 is a diagram illustrating a first gain and a second gain that are set for the photometric sensor 26 in processing from steps S304 to S306 of the flowchart of FIG. 7 in the third exemplary embodiment. That is, in the third exemplary embodiment, assuming that a lowest gain that can be set is 1 times (×1), the second gain is set to 4 times (×4) and the first gain is set to 1 times (×1) in a gain setting 1, as illustrated in FIG. 14. In a gain setting 2, the second gain is set to 8 times (×8) and the first gain is set to 2 times (×2), and in a gain setting 3, the second gain is set to 8 times (×8) and the first gain is set to 1 times (×1). A correspondence between the set gain and a subject distance with which photometry can be performed is not particularly different from that described in the first exemplary embodiment.

Also in the third exemplary embodiment, the processing proceeds to step S304 in FIG. 7 in a case where a condition is satisfied where the imaging magnification β is highly probably the imaging magnification in portrait imaging, and an imaging distance is short, such as less than 3 m, in a similar manner as described above. Then, when the processing proceeds to step S304, a control circuit 41 controls a gain to be set in the photometric sensor 26 to the gain setting 1 in FIG. 14 in order to perform photometry during preliminary light emission of a flash. That is, the control circuit 41 sets two kinds of gains to be set in the amplifier circuit in the AD converter of the photometric sensor 26 to be suitable for a subject at a short distance by combining relatively low sensitivities by setting the first gain to 1 times (×1) and the second gain to 4 times (×4) as in the gain setting 1.

Further, in the third exemplary embodiment, the processing proceeds to step S305 in FIG. 7 in a case where a condition is satisfied where the imaging magnification β is highly probably the imaging magnification in the portrait imaging, and the imaging distance is not short, such as not less than 3 m, in a similar manner as described above. Then, when the processing proceeds to step S305, the control circuit 41 sets a gain to be set in the photometric sensor 26 to the gain setting 2 in order to perform the photometry during the preliminary light emission of a flash. That is, the control circuit 41 sets the two kinds of the gains to be set in the amplifier circuit in the AD converter of the photometric sensor 26 to be suitable for a subject at a long distance by combining relatively high sensitivities by setting the first gain to 2 times (×2) and the second gain to 8 times (×8) as in the gain setting 2.

Further, in the third exemplary embodiment, the processing proceeds to step S306 in FIG. 7 in a case where a condition is satisfied where it is determined that the face has been detected in step S301 (YES in step S301), or the imaging magnification β is not within a range of 1/20 or more and 1/100 or less in step S302 (NO in step S302), in a similar manner as described above. Then, when the processing proceeds to step S306, the control circuit 41 sets a gain to be set in the photometric sensor 26 to the gain setting 3 in order to perform the photometry during the preliminary light emission of a flash. That is, the control circuit 41 sets the two kinds of the gains to be set in the amplifier circuit in the AD converter of the photometric sensor 26 to correspond to a wide range of subject distance by combining low sensitivity and high sensitivity by setting the first gain to 1 times (×1) and the second gain to 8 times (×8) as in the gain setting 3.

FIGS. 15A to 15D are diagrams illustrating specific examples of sensitivity difference correction of a digital photometric signal (photometric data) which is subjected to AD conversion with different gains, executed in the processing of steps S308 and S310 in FIG. 7. As described with reference to FIG. 14, in the third exemplary embodiment, any one of four kinds of analog gains, i.e., the analog gains set to 1 times (×1), 2 times (×2), 4 times (×4), and 8 times (×8), will be set as the analog gains during AD conversion for data of each pixel accumulated by the photometric sensor 26. Here, assuming that the number of AD conversion bits is 10 bits, for example, and description is made considering AD conversion data when the gain is set to 8 times (×8), which is a maximum gain in the present exemplary embodiment, as a reference.

As illustrated in FIG. 15A, the data for which the analog gain is set to 8 times (×8) and which is subjected to AD conversion is converted into 13-bit data by adding 3-bit data (D12 to D10) as dummy data to a higher order of 10-bit conversion data thereof (D9 to D0). Each bit value of the dummy data (D12 to D10) is 0.

As illustrated in FIG. 15B, in data for which the analog gain is set to 4 times (×4) and which is subjected to AD conversion, 10-bit conversion data thereof (D9 to D0) is shifted left by 1 bit and the value is doubled as data (D10 to D1). Further, 2-bit data (D12 to D11) is added as dummy data to a higher order of the 10-bit conversion data, and dummy data (D0) is added to a least significant bit to convert the 10-bit conversion data into 13-bit data. Each bit value of the dummy data (D12, D11, and D0) is 0.

As illustrated in FIG. 15C, in data for which the analog gain is set to 2 times (×2) and which is subjected to AD conversion, 10-bit conversion data thereof (D9 to D0) is shifted left by 2 bits and the value is quadrupled as data (D11 to D2). Further, 1-bit data (D12) is added as dummy data to a higher order of the 10-bits conversion data, and dummy data (D1 and D0) is added as lower bits to convert the 10-bits conversion data into 13-bit data. Each bit value of the dummy data (D12, D1, and D0) is 0.

As illustrated in FIG. 15D, in data for which the analog gain is set to 1 times (×1) and which is subjected to AD conversion, 10-bits conversion data thereof (D9 to D0) thereof is shifted left by 3 bits and the value is made eight times as data (D12 to D3). In addition, dummy data (D2 to D0) is added as lower bits of the 10-bits conversion data to convert the 10-bits conversion data into 13-bit data. Each bit value of the dummy data (D2 to D0) is 0.

In the third exemplary embodiment, by performing the above-described processing, a photometric signal can be generated in which a sensitivity difference is leveled out from a photometric signal in which a plurality of sensitivities is mixed between pixels due to selection of an optimum gain for each pixel from the set two kinds of analog gains.

Figure 16:
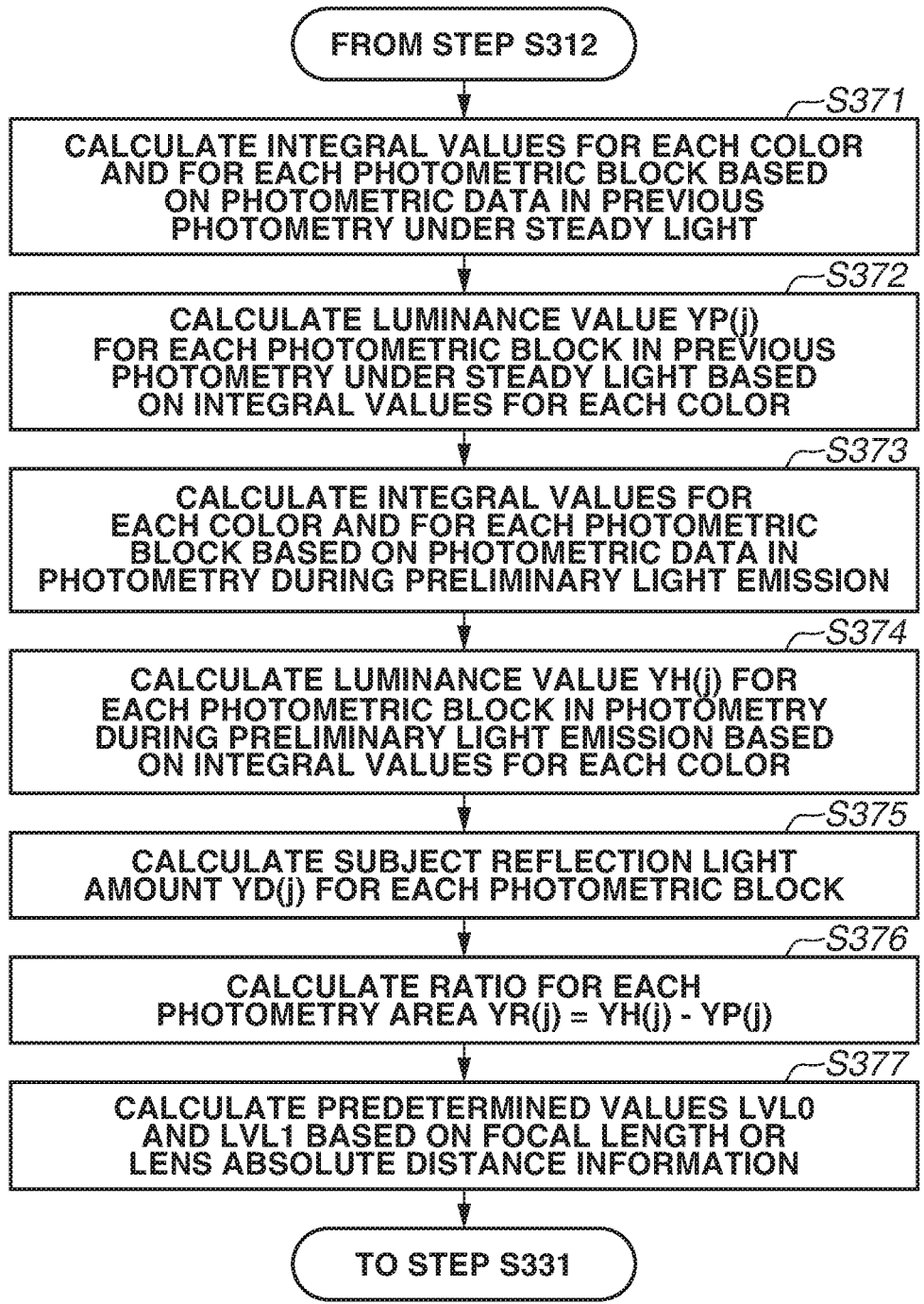
FIG. 16 is a flowchart of calculation of an amount of preliminary light emission according to the third exemplary embodiment.

FIG. 16 is the flowchart of the processing executed in the third exemplary embodiment instead of the processing of the flowchart of FIG. 11 of the first exemplary embodiment, and after the processing of step S312 in FIG. 7, the processing proceeds to step S371 of the flowchart of FIG. 16.

When the processing proceeds to step S371, similar to the case of the first exemplary embodiment described above, the control circuit 41 performs addition processing on a pixel signal from the photometric sensor 26 immediately before the preliminary light emission, which is input and in which gain difference is corrected in step S308 in FIG. 7, for each predetermined photometric block and for each color of R, G, and B. Data obtained as a result of the addition processing is set to RP(j), GP(j), and BP(j) for the colors of R, G, and B in a similar manner as described above.

Further, in step S372, the control circuit 41 calculates a luminance value YPr(j) based on RP(j), GP(j), and BP(j) for each photometric block, from Formula (4) described above.

Further, in the third exemplary embodiment, in a similar manner as described above, the control circuit 41 performs conversion function processing to a logarithmic compression system and correction processing Q on the luminance information YPr(i) immediately before the preliminary light emission in a linear system from Formula (5) described above, to obtain luminance information YP(j) in the logarithmic compression system.

Next, in step S373, similar the case of the first exemplary embodiment described above, the control circuit 41 performs addition processing on the pixel signal from the photometric sensor 26 during the preliminary light emission, which is input and in which gain difference is corrected in step S310 in FIG. 7, for each predetermined photometric block, for each color of R, G, and B. Data obtained as a result of the addition processing is set to RH(j), GH(j), and BH(j) for the colors of R, G, and B in a similar manner as described above.

Further, in step S374, the control circuit 41 calculates a luminance value YHr(j) based on RH(j), GH(j), and BH(j) for each photometric block, from Formula (6) described above.

Further, also in this case, in a similar manner as described above, the control circuit 41 performs conversion function processing to a logarithmic compression system and correction processing Q on the luminance information YHr(j) during the preliminary light emission in a linear system from Formula (7) described above, to obtain luminance information YH(j) during the preliminary light emission in the logarithmic compression system.

Next, in step S375, similar to the case of the first exemplary embodiment, the control circuit 41 calculates a luminance value YD(j) of only the reflected light of a flash during the preliminary light emission based on the luminance information YP(j) immediately before the preliminary light emission and the luminance information YH(j) during the preliminary light emission, for each photometric block.

Further, each of the luminance information YP(j) immediately before the preliminary light emission and the luminance information YH(j) during the preliminary light emission is a value in the compression system. Therefore, the control circuit 41 performs calculation from Formula (8) described above by obtaining a difference after operating on the exponentiated numbers to expand the values, and then performing logarithmic compression of the difference value.

Next, in step S376, the control circuit 41 calculates a ratio YR(j) of the luminance values from Formula (9) described above based on the luminance information YP(j) immediately before the preliminary light emission and the luminance information YH(j) during the preliminary light emission, for each photometric block.

Further, similar to the case described above in the first exemplary embodiment, each of the luminance information YP(j) immediately before the preliminary light emission and the luminance information YH(j) during the preliminary light emission is a value in the logarithmic compression system, and obtaining the difference therebetween is equivalent to obtaining a ratio of the luminance values.

Next, in step S377, similar to the case described above in the first exemplary embodiment, the control circuit 41 calculates predetermined values LVL0 and LVL1 based on subject distance information DT. The predetermined value LVL0 is calculated from Formula (10) described above, based on the subject distance information DT and emitted light amount information EL during the preliminary light emission. The predetermined value LVL1 is also determined by Formula (11) in a similar manner as described above.

Then, in the third exemplary embodiment, similar to the case of the first exemplary embodiment, on a premise that the reflected light during the preliminary light emission of the subject normally falls between the predetermined values LVL0 and LVL1 based on the subject distance information DT, the control circuit 41 performs calculation for determining the amount of the main light emission of a flash in a similar manner as described above.

Figure 17:
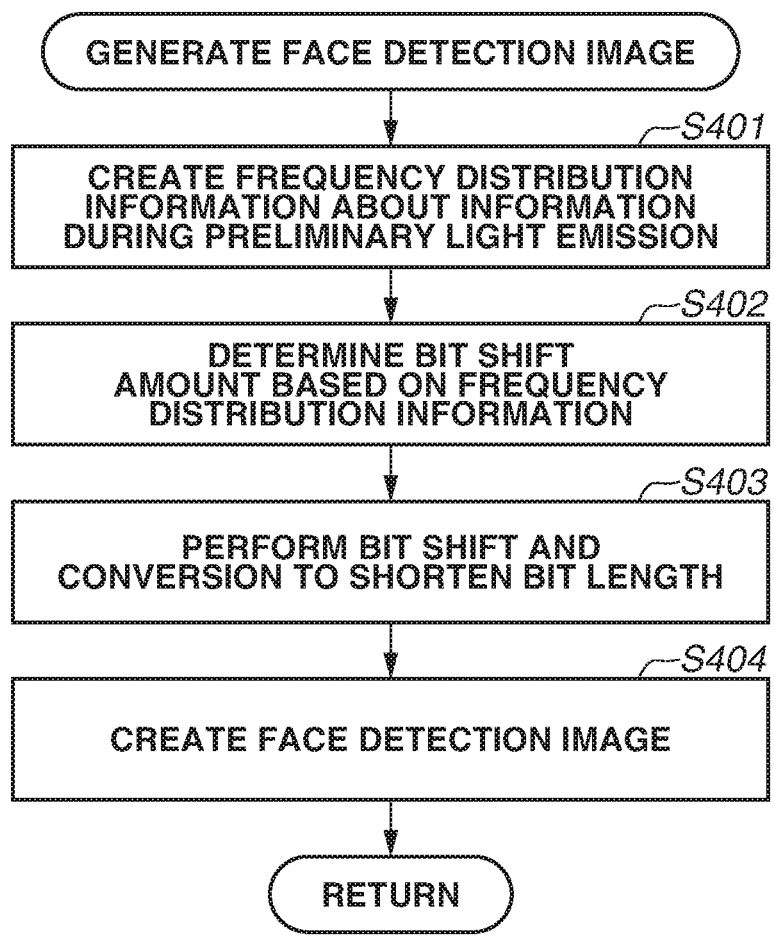
FIG. 17 is a flowchart of generation of a face detection image according to the third exemplary embodiment.

Further, in the third exemplary embodiment, generation of the face detection image executed in step S311 in FIG. 7 is performed in the processing of the flowchart of FIG. 17, instead of the processing of the flowchart of FIG. 9 of the first exemplary embodiment.

In step S401, a signal processing circuit 42 creates frequency distribution information about output values for each pixel unit based on the pixel signal of the photometric sensor 26 during the preliminary light emission, which is input and in which gain difference is corrected in step S310 in FIG. 7. Although the frequency distribution information may be generated based on information about all the pixels of the photometric sensor 26, it may take time since an information amount is too large. In such a case, an area in which the frequency distribution information is generated may be limited to an area where there is a high possibility that the main subject exists or an area regarded as being in focus to a degree which enables face detection, based on focus detection information of each part of a screen acquired in steps S104 to S105 in FIG. 5 described above.

A specific example of limiting the area in this manner will be described with reference to an example of an imaging composition in FIG. 18.

Figure 18:
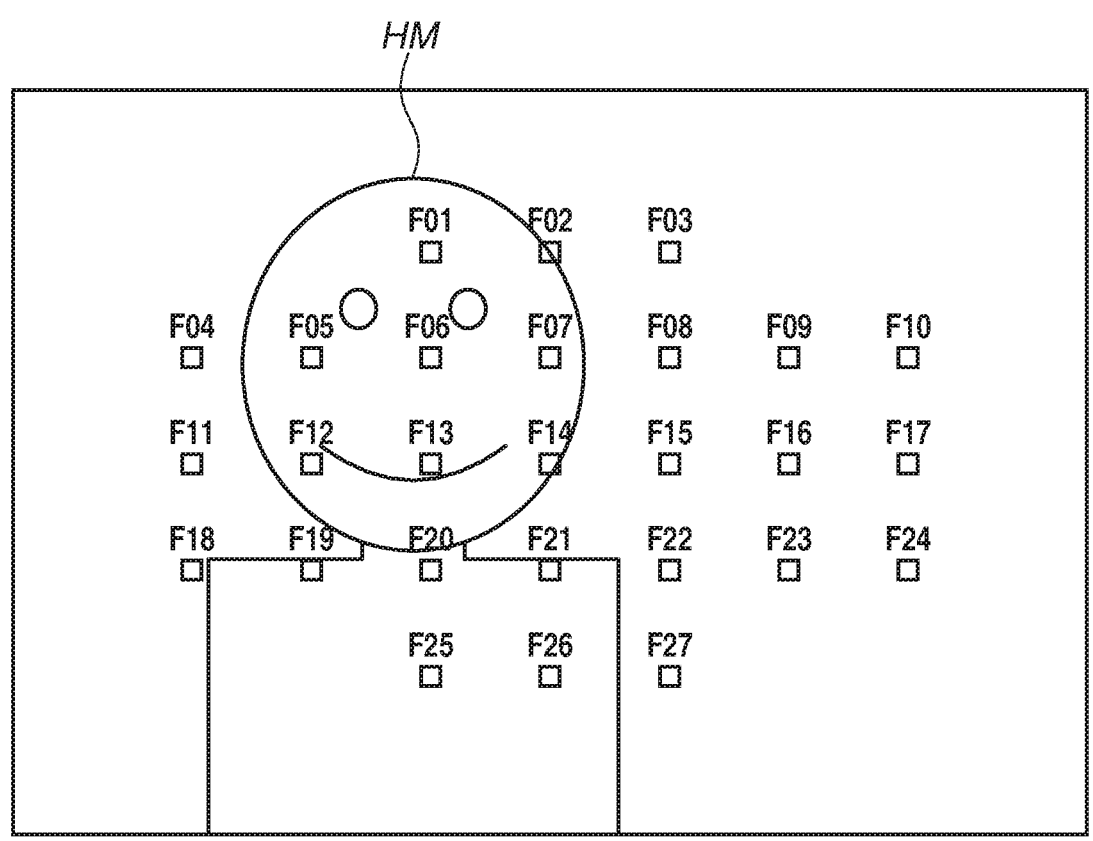
FIG. 18 is a diagram illustrating an example of an imaging composition.

FIG. 18 illustrates an example of the imaging composition, in which a person HM is arranged on a left side of a center of an imaging screen. In FIG. 18, focus detection positions F01 to F27 arranged in each part in the imaging screen based on the focus detection sensor 20 are also indicated.

Here, assuming that the person HM is brought into focus in a focus adjustment completion state of step S105 in FIG. 5. In this case, each piece of focus detection information acquired at each focus detection position F01 to F27 is information in an in-focus state or information having small deviation from the focus at each of positions F01, F02, F05 to F07, F12 to F14, F19 to F21, F25, and F26 corresponding to an area of the person HM. In contrast, focus detection information acquired at each of another focus detection position such as the focus detection position F03, i.e., a focus detection position corresponding to a background or the like excluding the in-focus person HM is information having large deviation from the focus. Meanwhile, for example, even in a case of an image in which a face of a person is imaged, in many cases, it is difficult to detect the face from the image in a case where the person is out of focus and the image is blurred. Therefore, the control circuit 41 creates the frequency distribution information based on an output value corresponding to each of the focus detection positions F01, F02, F05 to F07, F12 to F14, F19 to F21, F25, and F26, which is the in-focus state or which has small deviation from the focus, among the respective output values of the photometric sensor 26.

The description will be made returning to FIG. 17. After the processing of step S401, the processing proceeds to step S402. When the processing proceeds to step S402, the signal processing circuit 42 determines, based on the frequency distribution information created in step S401, a bit shift amount of the output value of each pixel of the pixel signal from the photometric sensor 26 during the preliminary light emission, in which the gain difference is corrected in the manner described with reference to FIGS. 15A to 15D. Here, as described with reference to FIGS. 15A to 15D, since a data length of each pixel of the pixel signal of the photometric sensor 26 during the preliminary light emission, in which the gain difference is corrected, is a 13-bit length, a pixel value of each pixel may exist within a range from a minimum value 0 to a maximum value 8191. Therefore, the signal processing circuit 42 determines the bit shift amount as illustrated in FIG. 19A.

That is, as illustrated in FIG. 19A, the signal processing circuit 42 determines the bit shift amount to be 5 in a case where the frequency of data having a pixel value of 255 or less is a predetermined value or more. The signal processing circuit 42 determines the bit shift amount to be 4 in a case where the frequency of the data having the pixel value of 255 or less is less than the predetermined value and the frequency of data having a pixel value of 511 or less is the predetermined value or more. Likewise, the signal processing circuit 42 determines the bit shift amount to be 3 in a case where the frequency of the data having the pixel value of 511 or less is less than the predetermined value and the frequency of data having a pixel value of 1023 or less is the predetermined value or more. The signal processing circuit 42 determines the bit shift amount to be 2 in a case where the frequency of the data having the pixel value of 1023 or less is less than the predetermined value and the frequency of data having a pixel value of 2047 or less is the predetermined value or more. The signal processing circuit 42 determines the bit shift amount to be 2 in a case where the frequency of the data having the pixel value of 2047 or less is less than the predetermined value and the frequency of data having a pixel value of 4095 or less is the predetermined value or more. The signal processing circuit 42 determines the bit shift amount to be 1 in a case where the frequency of the data having the pixel value of 4095 or less is less than the predetermined value and the frequency of data having a pixel value of 8191 or less is the predetermined value or more. The signal processing circuit 42 determines the bit shift amount to be 0 in a case where the frequency of the data having the pixel value of 4095 or less is less than the predetermined value.

Next, when the processing proceeds to step S403, the signal processing circuit 42 performs data conversion by processing of shifting the output value of each pixel of the pixel signal from the photometric sensor 26 during the preliminary light emission, in which the gain difference is corrected, to the left based on the determined bit shift amount, and shortening the bit length by discarding lower 5 bits. FIG. 19B illustrates an example of the case where the bit shift amount is determined to be 2. In the example, data having a 13-bit length in which gain difference is corrected is shifted left by 2 bits, and the bit shift is performed by inserting data "0" in lower 2 bits. Furthermore, as illustrated in FIG. 19C, the control circuit 41 discards lower 5 bits after the bit shift and truncates the data to be 8-bit data in which upper 8 bits are left.

Although there are already various types of hardware and the like having a function of detecting a face of a person from image information, in many cases, an image format required for an image of a detection source is a general-purpose format. In many of the general-purpose image formats, luminance information and color difference information are expressed in an 8-bit length. Therefore, here, a pixel data during preliminary light emission having a 13-bit length due to correction of the gain difference is converted into data having an 8-bit length. At that time, by executing the processing of step S403, a bit portion which is highly effective can be effectively cut out from the 13-bit length.

Next, in step S404, the signal processing circuit 42 generates an image for face detection from the data of each pixel converted into an 8-bit length in step S403. Here, similar to the case described above in the first exemplary embodiment, in the generation of the face detection image, interpolation processing for each color of R, G, and B is performed by a well-known method on a pixel array in a Bayer array of the photometric sensor 26 illustrated in FIG. 3B, and color information R, G, and B is given for each pixel. Subsequently, as in Formula (1) described above, a matrix operation with predetermined coefficients (M11 to M33) is performed on color information R(i), G(i), and B(i) for each pixel, and luminance information YR(i) and color difference information Cx(i) and Cy(i) are generated for each pixel to obtain face detection image information. Then, when the processing of step S404 ends, the processing proceeds to step S312 in FIG. 7, and the signal processing circuit 42 performs the face detection processing.

Although the exemplary embodiments of the disclosure have been described above, the disclosure is not limited to these exemplary embodiments, and various modifications and changes are possible within a scope of a gist of the disclosure.

The numerical values and the like used in the first to third exemplary embodiments are merely examples, and the disclosure is not limited thereto. In each exemplary embodiment, an example has been described in which the photometry during the preliminary light emission of a flash is performed by the photometric sensor 26 provided separately from the image pickup element 12. However, even in a case where the photometry during the preliminary light emission of a flash is performed by the image pickup element 12, a technique similar to the technique described above can be applied. Further, in each exemplary embodiment, a sensitivity difference due to the gain and a sensitivity difference due to the area may be used in combination, for example.

Further, in the above-described exemplary embodiment, an example is described in which a face or the like is detected from the image generated from the photometric signal of the reflected light and an appropriate amount of the main light emission of a flash is obtained for the area of the face. However, use of the detected face image does not necessarily have to be limited to obtaining the main light emission amount. As an example, the detected face image may be used for face recognition or the like when specifying an individual. Besides, the subject to be imaged is not limited to the face and may be a vehicle such as an automobile, various products or industrial products, or various other subjects such as animals, and the present exemplary embodiment can be applied to any one of them.

In the above-described exemplary embodiment, a so-called single-lens reflex digital camera with an interchangeable lens is exemplified. However, the present exemplary embodiment can also be applied to other image pickup apparatuses as long as flash light emission is possible. For example, the present exemplary embodiment can be applied not only to digital cameras, but also to film cameras, various portable terminals such as smart phones and tablet terminals equipped with camera functions, various surveillance cameras, industrial cameras, onboard cameras, medical cameras, and the like.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-017494, filed Feb. 2, 2018, which is hereby incorporated by reference herein in its entirety.

What is claimed is:

1. An apparatus comprising:
a sensor including a plurality of arranged pixels, having a first sensitivity for a first area of the plurality of arranged pixels and a second sensitivity lower than the first sensitivity for a second area of the plurality of arranged pixels during preliminary light emission of a flash;
a processing circuit configured to perform correction corresponding to a difference between the first sensitivity and the second sensitivity on a signal acquired from the sensor, and generate an image based on the corrected signal; and
a control circuit configured to detect a subject area using the image and determine the amount of light emission during the main light emission of the flash with respect to the detected the subject area.

2. The apparatus according to claim 1, wherein the correction corresponding to the difference between the first sensitivity and the second sensitivity is any one of a process of lowering a sensitivity of an image in the first area to match a sensitivity of an image in the second area, a process of interpolating an image in the first area with image information in the second area, a process of increasing a sensitivity of an image in the second area to match a sensitivity of an image in the first area, and a process of interpolating an image in the second area with image information in the first area.

3. The apparatus according to claim 2, wherein the processing circuit selects any one of the processes for performing the correction corresponding to the difference between the first sensitivity and the second sensitivity based on frequency distribution of information in the first area and frequency distribution of information in the second area.

4. The apparatus according to claim 1, wherein the sensor sets a first gain for the first area, and sets a second gain lower than the first gain for the second area.

5. The apparatus according to claim 1, wherein an area for receiving light of each pixel included in the first area is larger than an area for receiving light of each pixel included in the second area.

6. The apparatus according to claim 1, wherein the sensor sets a gain when a signal read out from the first area is subjected to AD conversion, to a first gain and a gain when a signal read out from the second area is subjected to AD conversion, to a second gain lower than the first gain during the preliminary light emission of the flash.

7. The apparatus according to claim 1, wherein the control circuit changes at least one of the first sensitivity and the second sensitivity depending on whether the subject area is detected from a signal based on steady light immediately before the preliminary light emission of the flash.

8. The apparatus according to claim 1, wherein the control circuit acquires an imaging magnification or a subject distance, and changes at least one of the first sensitivity and the second sensitivity based on the imaging magnification or the subject distance.

9. A method for controlling an apparatus comprising:
acquiring a signal from a sensor including a plurality of arranged pixels and having a first sensitivity for a first area of the plurality of arranged pixels and a second sensitivity lower than the first sensitivity for a second area of the plurality of arranged pixels during preliminary light emission of a flash;
performing correction corresponding to a difference between the first sensitivity and the second sensitivity on the signal acquired from the sensor, and generating an image based on the corrected signal;
detecting a subject area using the image; and
determining the amount of light emission during the main light emission of the flash with respect to the detected the subject area.

10. The method according to claim 9, wherein the sensor sets a first gain for the first area, and sets a second gain lower than the first gain for the second area.

11. The method according to claim 9, further comprising changing at least one of the first sensitivity and the second sensitivity depending on whether the subject area is detected from a signal based on steady light immediately before the preliminary light emission of the flash.

12. The method according to claim 9, further comprising acquiring an imaging magnification or a subject distance, and changing at least one of the first sensitivity and the second sensitivity based on the imaging magnification or the subject distance.

13. A non-transitory storage medium storing a program for causing a computer included in an apparatus to execute a control method, the control method comprising:
acquiring a signal from a sensor including a plurality of arranged pixels and having a first sensitivity for a first area of the plurality of arranged pixels and a second sensitivity lower than the first sensitivity for a second area of the plurality of arranged pixels during preliminary light emission of a flash;
performing correction corresponding to a difference between the first sensitivity and the second sensitivity on the signal acquired from the sensor, and generating an image based on the corrected signal;
detecting a subject area using the image; and
determining the amount of light emission during the main light emission of the flash with respect to the detected the subject area.

14. The non-transitory storage medium according to claim 13, wherein the sensor sets a first gain for the first area, and sets a second gain lower than the first gain for the second area.

15. The non-transitory storage medium according to claim 13, further comprising changing at least one of the first sensitivity and the second sensitivity depending on whether the subject area is detected from a signal based on steady light immediately before the preliminary light emission of the flash.

16. The non-transitory storage medium according to claim 13, further comprising acquiring an imaging magnification or a subject distance, and changing at least one of the first sensitivity and the second sensitivity based on the imaging magnification or the subject distance.

* * * * *